United States Patent
Edasawa et al.

(10) Patent No.: US 6,831,981 B2
(45) Date of Patent: Dec. 14, 2004

(54) INFORMATION TRANSCEIVER SYSTEM

(75) Inventors: Masanobu Edasawa, Kobe (JP); Hisayoshi Kuraya, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 10/191,043

(22) Filed: Jul. 3, 2002

(65) Prior Publication Data
US 2003/0005293 A1 Jan. 2, 2003

Related U.S. Application Data

(63) Continuation of application No. PCT/JP00/00031, filed on Jan. 7, 2000.

(51) Int. Cl.[7] .................................................. H04L 9/00
(52) U.S. Cl. ..................... 380/278; 713/200; 370/465
(58) Field of Search ................ 380/278, 20; 178/22.08; 713/200; 370/465

(56) References Cited

U.S. PATENT DOCUMENTS 4,802,215 A * 1/1989 Mason ..................... 380/231
4,890,321 A * 12/1989 Seth-Smith et al. ........ 380/231

FOREIGN PATENT DOCUMENTS

JP  05-327748   12/1993
JP  11-215146   8/1999

* cited by examiner

Primary Examiner—Kim Vu
Assistant Examiner—Thanhnga Truong
(74) Attorney, Agent, or Firm—Katten Muchin Zavis Rosenman

(57) ABSTRACT

In an information transceiver system for transmitting/receiving specific information, an information transmission device transmits a key message in which a specific information cipher key is ciphered with a usual key, and transmits to a destination information reception device a cipher message in which specific information is ciphered with the specific information cipher key. The information reception device deciphers a specific information cipher key included in a key message with a usual key, and deciphers with the specific information cipher key the cipher message following the key message. Also, in the presence of a plurality of destination information reception devices, the information transmission device provides to the information reception devices setting information of broadcast setting information of a unicast, a broadcast, or the like, cipher setting information, vendor setting information, group setting information, or the like.

33 Claims, 14 Drawing Sheets

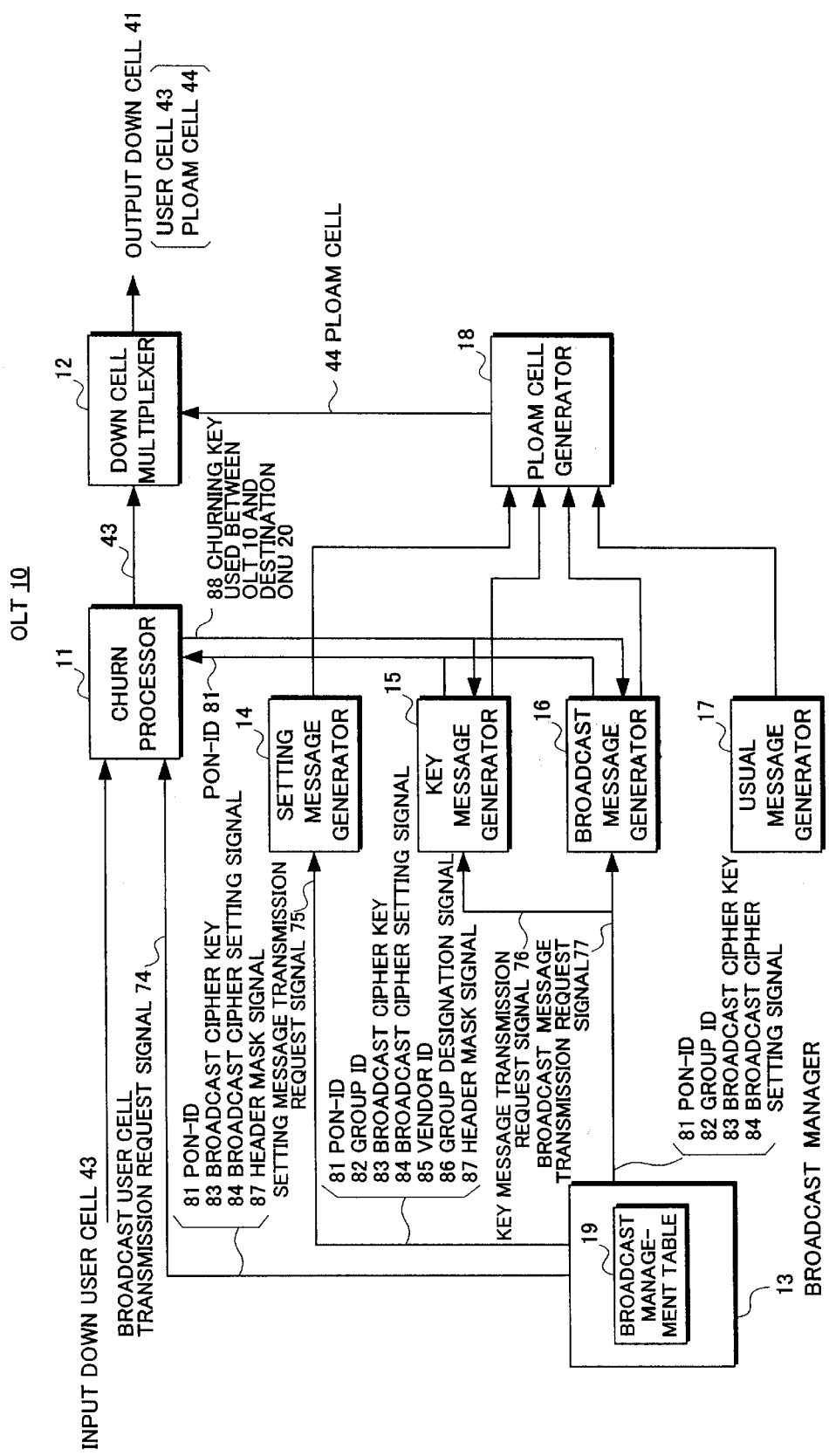

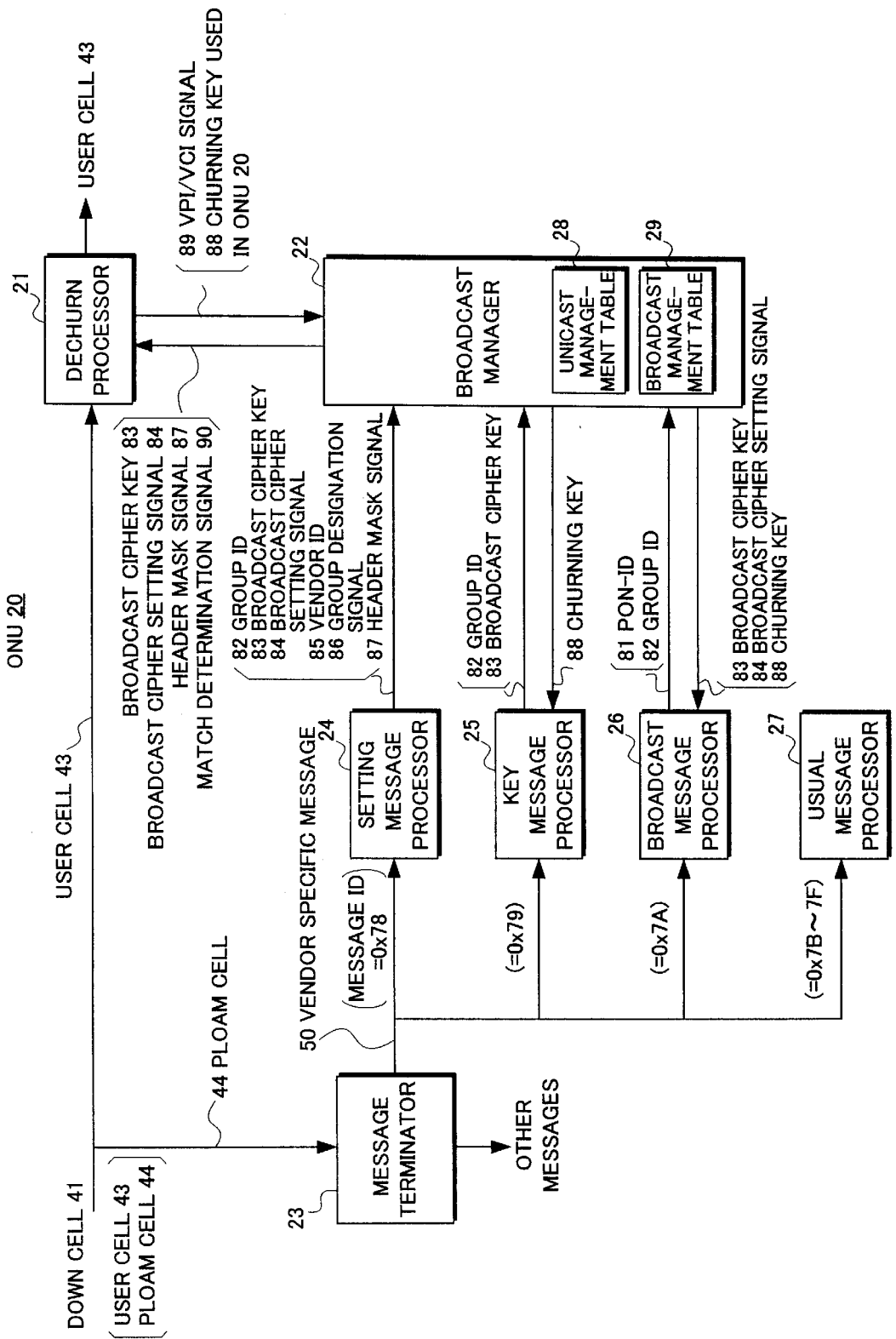

FIG.3

71 SETTING MESSAGE

| OCTET NO. | | |
|---|---|---|
| 40 | 01000000 or PON-ID | ← 51 PON-ID FIELD { 01000000(="0x40"):DESIGNATE ALL ONU'S / OTHERS:DESIGNATE SPECIFIC ONU WITH PON-ID |
| 41 | 01111000 | ← 52 MESSAGE ID FIELD (="0x78") INDICATING SETTING MESSAGE |
| 42 | mmmmmmmm | ← 55 GROUP ID FIELD |
| 43 | SSSSSXGC | ← 56 BROADCAST CIPHER SETTING FIELD |
| 44 | yyyyyyyy | |
| 45 | yyyyyyyy | |
| 46 | yyyyyyyy | |
| 47 | yyyyyyyy | |
| 48 | yyyyyyyy | |
| 49 | yyyyyyyy | |
| 50 | yyyyyyyy | |
| 51 | yyyyyyyy | |
| 52 | cccccccc | ← 54 CRC CALCULATION RESULT FIELD OF MESSAGE FIELD |

SSSSS : BROADCAST TYPE SETTING
G:BROADCAST SETTING { G="1"BROADCAST START SETTING / G="0"BROADCAST RELEASE SETTING
C:CIPHER SETTING { C="1"CIPHER START SETTING / C="0"CIPHER RELEASE SETTING
X:DON'T CARE

CONTENTS DEPENDING ON BROADCAST TYPE

53 MESSAGE FIELD

FIG.4

71_1 SETTING MESSAGE (UNICAST SETTING)

| OCTET NO. | | |
|---|---|---|
| 40 | PON-ID | ← 51 |
| 41 | 01111000 | ← 52 |
| 42 | UNSPECIFIED | UNUSED |
| 43 | 00001XXC | ← 56 |
| 44 | UNSPECIFIED | |
| 45 | UNSPECIFIED | |
| 46 | UNSPECIFIED | |
| 47 | UNSPECIFIED | UNUSED |
| 48 | UNSPECIFIED | |
| 49 | UNSPECIFIED | |
| 50 | UNSPECIFIED | |
| 51 | UNSPECIFIED | |
| 52 | cccccccc | ← 54 |

SSSSS="00001" BROADCAST TYPE SETTING INDICATING UNICASTING
C : CIPHER SETTING

BIP8 CALCULATION RESULT BETWEEN PLOAM CELLS

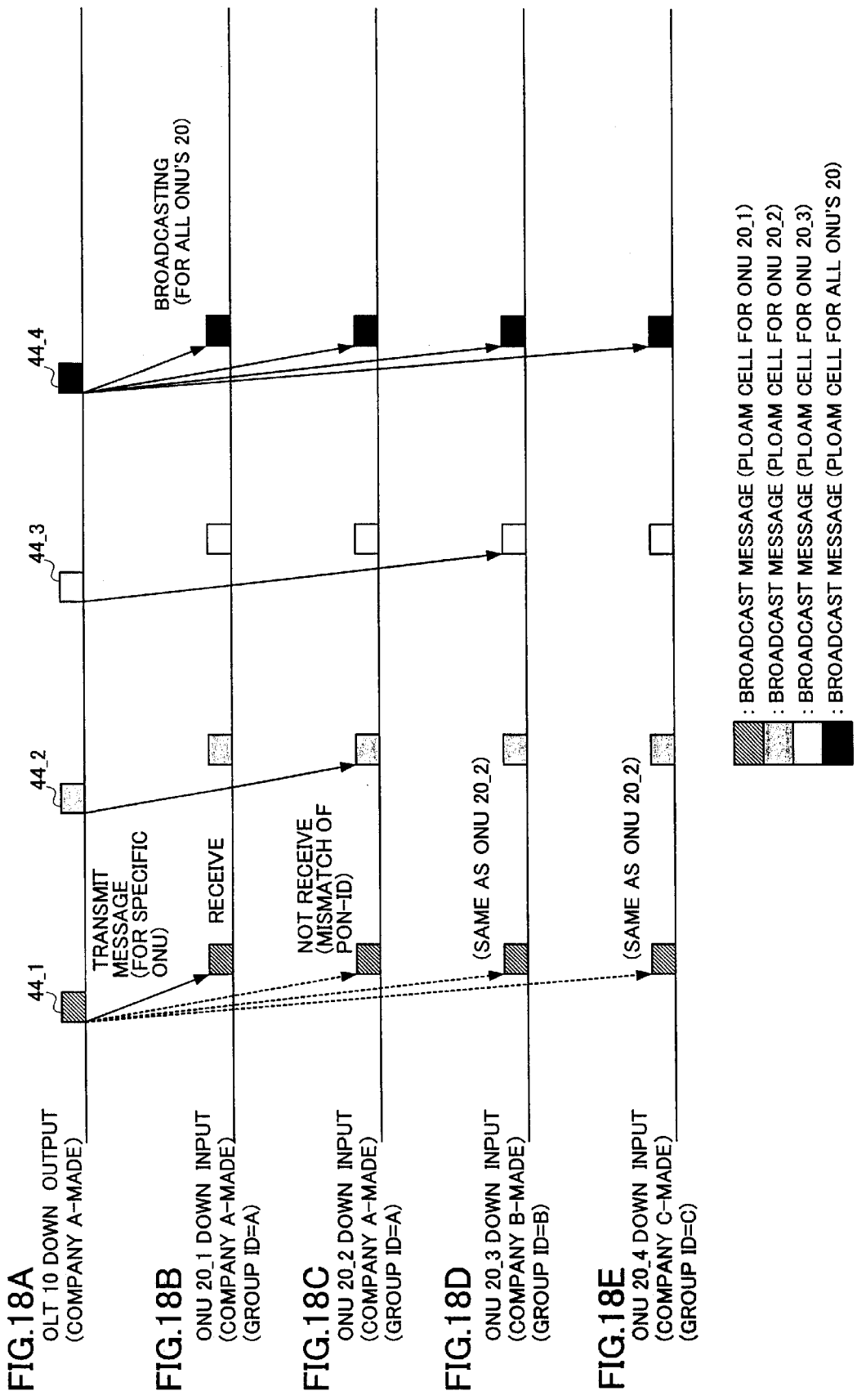

US 6,831,981 B2

INFORMATION TRANSCEIVER SYSTEM

This application is a continuation of international application number PCT JP00/00031, filed Jan. 7, 2000 (status, abandoned, pending, etc.).

BACKGROUND OF THE INVENTION

1. Field of the Invention

The present invention relates to an information transceiver system, and in particular to an information transmission device or an information reception device in an information transceiver system for transmitting/receiving specific information.

Recently, owing to developments of communication technologies, various forms by which the information transceiver system transmits/receives information such as cells, packets and frames have been reduced to practice.

In such an information transceiver system, it is important to limit information to be transmitted/received within a specific group or to prevent the information from being recognized by others depending on an importance of the information.

2. Description of the Related Art

FIG. 16 shows an ATM-PON (Asynchronous Transfer Mode Passive Optical Networks) system that is one arrangement of an information transceiver system. This network system is composed of an Optical Line Terminator (hereinafter, abbreviated as OLT) 10, an optical coupler 30 connected to the OLT 10, and Optical Network Units (hereinafter, abbreviated as ONU's) 20_1–20_n (hereinafter, occasionally represented by a reference numeral 20; n=64 at the maximum) connected to the optical coupler 30.

In the ATM-PON system, a transmission of information is performed by cells. The OLT 10 transmits a down cell 41 to the ONU's 20 which respectively receive the same down cell 41 through the optical coupler 30. The ONU's 20 respectively transmit up cells 42_1–42_n to the OLT 10 through the optical coupler 30. After going through the optical coupler 30, the up cells 42_1–42_n are transmitted to the OLT 10 in time sequence.

G.983 that is ITU-T recommendation is set up in the ATM-PON system. The down cell 41 and the up cell 42 respectively have two types of cells, a user cell and a Physical Layer Operation And Maintenance Cell (hereinafter, abbreviated as PLOAM cell) for management.

The PLOAM cell is periodically multiplexed into a user cell to be transmitted, so that manager information is exchanged between the OLT 10 and the ONU's 20 by using a message field of the PLOAM cell.

The G.983 prescribes the usage of the message field, that is a message called a vendor specific message. A detailed usage of the vendor specific message is not prescribed in the G.983, so that the vendor specific message is permitted to be freely used per vendor.

FIG. 17 shows a format of a down PLOAM cell. This cell is composed of 53 octets, i.e. 5 octets of octet Nos. "1"–"5" for a header field 45 and 48 octets of octet Nos. "6"–"53" for a payload field 46. The header field 45 includes a 12-bit Virtual Path Identifier (hereinafter, abbreviated as VPI) field, a 16-bit Virtual Channel Identifier (hereinafter, abbreviated as VCI) field, and a 3-bit Payload Type (hereinafter, abbreviated as PT) field.

Destination addresses of cells are indicated in the VPI and VCI fields, and the type of cells such as a user cell or an OAM cell is indicated in the PT field. When the highest bit is "1" in the PT field, it is indicated that the cell is the PLOAM cell. When the highest bit is "0", it is indicated that the cell is the user cell. It is to be noted that a user network interface has the VPI field only for the lower 8 bits, and a GFC field for the higher 4 bits.

A vendor specific message field 50 is composed of 13 octets of octet Nos. "40"–"52" in the payload field 46. The Nos. "40" and "41" are respectively a PON-ID (Passive Optical Network Identifier) field 51 and a message ID field 52. The octet Nos. "42"–"51" and "52" are respectively a message field 53 and a CRC calculation result field 54.

The PON-ID field 51 is a field for designating an ONU which receives a message. When all of the ONU's are designated, "01000000" is set. When the ONU's are individually designated, a designating PON-ID is set.

The message ID field 52 is a field for indicating a type of a message. When the value thereof is "01111XXX", it indicates a vendor specific message.

The vendor specific message may be used for so-called SWDL (SoftWare DownLoad) or the like where the OLT 10 supplies a necessary software to the ONU's 20. However, when the message field in plain text, not ciphered is transmitted as it is, there is a possibility that the contents of the message is disclosed to the ONU's 20 other than the destination ONU.

However, in the G.983, the method of ciphering the message field of the vendor specific message has not been prescribed.

Also, in the G.983, broadcasting of a vendor specific message in which specific ONU's 20 are regarded as forming a single group has not been prescribed. Namely, it has been impossible to perform the ciphering and the broadcasting of the message field.

On the other hand, broadcasting the user cell can be applied to all ONU's 20 such as a cable TV. However, there is a possibility that the user cell in plain text is received by the ONU's 20 other than the destination ONU.

However, in the G.983, while the ciphering method of the user cell is prescribed by churning/dechurning as a usual key for the case the OLT 10 and the ONU 20 are in a one-to-one relationship, the method is not prescribed for the case the OLT and the ONU are in a one-to-many relationship. Namely, it has been impossible to perform a broadcast ciphering of the user cell.

This will be specifically described referring to FIGS. 18A–18E.

FIGS. 18A–18E show an operation example of the ATM-PON system shown in FIG. 16. This example especially shows a case where a PLOAM cell 44 in the down cell 41 is transmitted from the OLT 10 to the ONU's 20_1–20_4. Each ONU 20 has its own identifier, the PON-ID.

FIG. 18A shows PLOAM cells 44_1–44_4 (hereinafter, represented by a reference numeral 44) transmitted by the OLT 10. FIGS. 18B–18E show the PLOAM cells 44_1–44_4 respectively received by the ONU's 20_1–20_4.

Both of the ONU's 20_1 and 20_2 are devices made by a vendor company A, and their vendor ID is "A". The ONU's 20_3 and 20_4 are devices respectively made by a vendor company B and a vendor company C, and their vendor ID's are "B" and "C".

When transmitting a vendor specific message to the ONU 20_1 in FIG. 18A, the OLT 10 sets the PON-ID of the ONU 20_1 in the PON-ID field 51 (see FIG. 17), and transmits the PLOAM cell 44_1 in which a predetermined message is inserted into the message field 53.

In FIG. 18B, the ONU 20_1 receives the PLOAM cell 44_1, and receives the message since the PON-ID of the PON-ID field 51 in the PLOAM cell matches its own PON-ID.

In FIGS. 18C–18E, each of the ONU's 20_2–20_4 respectively receives the PLOAM cell 44_1, but does not receive the message since the PON-ID set in the PON-ID field 51 does not match its own PON-ID.

When transmitting the vendor specific message to the ONU's 20_1 and 20_2 that are the devices made by the same vendor company A, the OLT 10 firstly transmits the PLOAM cell 44_1 in which the PON-ID of the ONU 20_1 is set in the PON-ID field 51. The ONU 20_1 receives the message.

Furthermore, the OLT 10 transmits the PLOAM cell 44_2 in which the PON-ID of the ONU 20_2 is set in the PON-ID field 51. The ONU 20_2 receives the message.

Also, when the ONU's 20_1–20_3 are made to form a single group and the same message is transmitted to this group, the OLT 10 sets the PON-ID's of the respective ONU's 20_1–20_3 in the PON-ID fields 51, and sequentially transmits the PLOAM cells 44_1–44_3 in which the same message is inserted into the message field 53. The ONU's 20_1–20_3 respectively receive the messages from the PLOAM cells 44 in which their own PON-ID's are set.

In FIG. 18A, when transmitting the same message to all of the ONU's 20, the OLT 10 sets the PON-ID="01000000" indicating that all of the ONU's are designated in the PON-ID field 51, and transmits the PLOAM cell 44_4 in which the message is inserted into the message field 53. The ONU's 20_1–20_4 receive the messages referring to the PON-ID's.

Thus, it is possible to transmit/receive messages between a single OLT and a single ONU, and between a single OLT and all of the ONU's. However, when specific ONU's 20 are made to form a single group and the same message is transmitted to this group, it has been required to change the destination of the message and to send the message as many times as the number of ONU's in the group.

Similarly, when a user cell 43 (not shown) of the same contents are transmitted to a plurality of ONU's 20 by ciphering, it has been required to transmit the user cell as many times as the number of ONU's in the group by churning/dechurning which is the ciphering method by the usual key of one-to-one prescribed by the G.983.

In such a prior art information transceiver system, when specific ONU's 20 are made to form a single group and the PLOAM cell or the user cell of the message having the same contents is transmitted to the group, it has been disadvantageous that the transmission has to be repeated as many times as the number of ONU's within the group, which results in a problem that a line capacity is suppressed and a communication time is prolonged.

SUMMARY OF THE INVENTION

It is accordingly an object of the present invention to provide an information transceiver system for transmitting/receiving specific information, wherein efficiencies of unicasting, vendor broadcasting, group broadcasting, and ciphering and deciphering them are improved.

(1) In order to achieve the above-mentioned object, an information transmission device according to the present invention comprises: a cipher message generator for generating a cipher message in which specific information is ciphered with a specific information cipher key; a key message generator for generating a key message in which the specific information cipher key is ciphered with a usual key used between its own device and a destination information reception device; and a message transmitter for transmitting the key message and the following cipher message to the destination information reception device corresponding thereto.

Namely, a key message generator generates a specific information cipher key, ciphers the specific information cipher key with a usual key used between the information transmission device itself and an information reception device, and generates a key message including the ciphered specific information cipher key. A message transmitter transmits the key message to the destination information reception device, and then transmits the ciphered message to the information reception device.

Thus, the information reception devices other than the destination information reception device can not decipher the specific information cipher key included in the received key message. Namely, the specific information cipher key is transmitted only to the destination information reception device of the key message.

(2) Also, in the above-mentioned present invention (1), in presence of a plurality of destination information reception devices, the key message generator may generate key messages in which the specific information cipher key is ciphered with usual keys used between its own device and the destination information reception devices, and the cipher message generator may generate the cipher message for the information reception devices.

Namely, in the presence of a plurality of destination information reception devices, the key message generator firstly generates a key message in which the specific information cipher key is ciphered with a usual key used between the information transmission device itself and a single destination information reception device, and the message transmitter transmits the ciphered key message to the destination information reception device.

Hereafter, the key messages in which the same specific information cipher keys as the above-mentioned cipher key ciphered with usual keys used between the information transmission device itself and remaining information reception devices are similarly generated, and the message transmitter sequentially transmits the ciphered key messages to the remaining information reception devices corresponding thereto.

Then, the cipher message generator transmits the cipher message in which the specific information is ciphered with the specific information cipher key to the information reception devices.

Thus, while the specific information is disclosed only to the information reception device having the specific information cipher key since the specific information is ciphered with the specific information cipher key, it is not disclosed to other information reception devices.

Accordingly, it becomes possible to transmit the same ciphered specific information to a plurality of information reception devices by broadcasting in a one-to-many relationship.

(3) Also, in order to achieve the above-mentioned object, an information reception device according to the present invention comprises: a key message processor for deciphering a specific information cipher key included in a received key message addressed to its own device with a usual key used between its own device and a source information transmission device; and a cipher message processor for deciphering with the specific information cipher key a cipher message following the key message and ciphered with the specific information cipher key from the source information transmission device.

Namely, a key message processor deciphers a specific information cipher key included in a key message addressed to its own device with a usual key used between the information reception device itself and an information transmission device. A cipher message processor receives a cipher message and deciphers the same with the specific information cipher key.

Thus, it becomes possible for the information reception device to receive only the specific information cipher key distributed to its own device, and to decipher the cipher message ciphered with the specific information cipher key.

It is to be noted that the cipher message may comprise a broadcast message addressed to a plurality of information reception devices.

(4) Also, in the above-mentioned present invention (1) or (2), the information transmission device may further comprise a setting message generator for generating a setting message including cipher setting information indicating whether or not the specific information is set to be ciphered with the specific information cipher key, the message transmitter may transmit the setting message and then transmit the cipher message ciphered with the specific information cipher key when the specific information is set to be ciphered, while otherwise may transmit a not-ciphered cipher message.

Namely, a setting message generator generates a setting message indicating whether or not the specific information is set to be ciphered with the specific information cipher key, and transmits the cipher message ciphered with the specific information cipher key after transmitting the setting message, when the specific information is set to be ciphered.

When the specific information is not set to be ciphered, the message transmitter transmits a cipher message not ciphered with the specific information cipher key.

Thus, when the contents of the specific information are less significant for example, it becomes possible to transmit the specific information without being ciphered with the specific information cipher key, and to omit the generation of the specific information cipher key and its transmission processing.

(5) Also, in the above-mentioned present invention (4), when the specific information is not set to be ciphered with the specific information cipher key, the message transmitter may transmit a message in which the specific information is ciphered with the usual key.

Namely, when the setting message does not indicate that the specific information is set to be ciphered with the specific information cipher key, the message transmitter transmits a message in which the specific information is ciphered with a usual key.

Thus, it is also possible to cipher the specific information with the usual key and to transmit the same.

(6) Also, in the above-mentioned present invention (2), the information transmission device may further comprise a setting message generator for generating a setting message including broadcast setting information indicating whether or not the cipher message should be transmitted by broadcasting, the message transmitter may transmit the setting message and then transmit the cipher message by broadcasting when broadcasting is set, while otherwise may transmit the cipher message addressed to the information reception devices by unicasting.

Namely, unicasting indicates a form in which an information transmission device and a reception device mutually communicate in a one-to-one relationship. Broadcasting indicates a form in which an information transmission device and a reception device mutually communicate in a one-to-many relationship. A setting message generator generates a setting message including broadcast setting information indicating whether or not the cipher message is transmitted by broadcasting, so that the message transmitter transmits the setting message.

When broadcasting is set, the message transmitter transmits the cipher message by the broadcasting addressed to all of the information reception devices. When broadcasting is not set, the message transmitter transmits the cipher message by unicasting to the information reception devices.

Thus, it becomes possible to transmit the cipher message by unicasting or broadcasting.

(7) Also, in the above-mentioned present invention (6), the setting message may further include vendor setting information for designating that the broadcasting is performed only to information reception devices made by a same vendor, and the message transmitter, after transmitting the setting message, may transmit the cipher message by vendor broadcasting when a vendor and broadcasting are set.

Namely, the setting message generator generates the setting message further including vendor setting information designating a vendor of the information reception device. When a vendor and broadcasting are set, the message transmitter, after transmitting the setting message, transmits the cipher message by broadcasting only to the information reception device made by the vendor designated by the vendor setting information.

Thus, it becomes possible to transmit the cipher message by a vendor broadcast.

(8) Also, in the above-mentioned present invention (6), the setting message may further include group setting information for designating that the broadcasting is performed only to information reception devices in a specific group, and the message transmitter, after transmitting the setting message, may transmit the cipher message by group broadcasting when a group and broadcasting are set.

Namely, the setting message generator generates the setting message further including group setting information designating a specific group of the information reception devices. When a group and broadcasting are set, the message transmitter, after transmitting the setting message, transmits the cipher message by broadcasting only to the information reception device whose group setting information belongs to a specific group.

Thus, it becomes possible to transmit the cipher message by a group broadcast.

(9) Also, in the above-mentioned present invention (3), the information reception device may further comprise a setting message processor for receiving a setting message from the source information transmission device, the setting message processor may store cipher setting information included in the setting message and indicating whether or not the specific information is set to be ciphered with the specific information cipher key, and the cipher message processor, based on the cipher setting information, may receive the cipher message after being deciphered with the specific information cipher key or without being deciphered.

Namely, a setting message processor stores the cipher setting information indicating whether or not the specific information included in the received setting message is ciphered with the specific information cipher key.

When the cipher setting information indicates that the specific information is set to be ciphered, the cipher message processor deciphers the received cipher message, with the specific information cipher key, to be received. When the cipher setting information indicates that the specific information is not set to be ciphered, the cipher message processor receives the cipher message without being deciphered.

Thus, it becomes possible to receive the specific information included in the ciphered message not ciphered with the specific information cipher key.

(10) Also, in the above-mentioned present invention (3), the information reception device may further comprise a setting message processor for receiving a setting message from the source information transmission device, the setting message processor may store broadcast setting information included in the setting message and indicating whether or not the cipher message is transmitted by broadcasting, and the cipher message processor, based on the broadcast setting information, may receive a cipher message for unicasting or broadcasting.

Namely, a setting message processor receives and stores broadcast setting information included in the received setting message and indicating whether or not the cipher message is transmitted by broadcasting.

When the broadcast setting information indicates that broadcasting is set, the cipher message processor receives a cipher message for a broadcast. When the broadcast setting information indicates that unicasting is set, the cipher message processor receives a cipher message for unicasting addressed to its own device.

Thus, it becomes possible for the information reception device to receive a cipher message for unicasting or broadcasting.

(11) Also, in the above-mentioned present invention (10), when a vendor designated by vendor setting information included in the setting message is a vendor of its own device, the setting message processor may store that the vendor of its own device is designated, and when a vendor and broadcasting are designated, the cipher message processor may receive a cipher message for vendor broadcasting addressed to its own vendor.

Namely, when vendor setting information designating its own device is included in the received setting message, the setting message processor stores that its own vendor is designated.

When the vendor of its own device and broadcasting are designated, the cipher message processor receives a cipher message for vendor broadcasting designating its own vendor.

Thus, it becomes possible for the information reception device to receive a ciphered message of vendor broadcasting.

(12) Also, in the above-mentioned present invention (10), when its own device belongs to a group designated by group setting information included in the setting message, the setting message processor may store a group ID thereof, and when a group ID and broadcasting are designated, the cipher message processor may receive a cipher message of group broadcasting of the group to which its own device belongs.

Namely, when group setting information designating its own device is included in the received setting message, the setting message processor stores a group ID thereof.

When, a group ID and broadcasting are designated, the cipher message processor receives a cipher message of group broadcasting designating the group ID to which its own device belongs.

Thus, it becomes possible for the information reception device to receive a ciphered message of group broadcasting.

(13) Also, in the above-mentioned present invention (1) or (2), the information transmission device may comprise an OLT device prescribed by ITU-T G.983.

Namely, it is possible to make an OLT device prescribed by the ITU-T G.983 corresponding to the information transmission device of the present invention.

(14) Also, in the above-mentioned present invention (3), the information reception device may comprise an ONU device prescribed by ITU-T G.983.

Namely, it is possible to make an ONU device prescribed by the ITU-T G.983 corresponding to the information reception device of the present invention.

Thus, it is possible to make the OLT device an information transmission device and to make the ONU device an information reception device in the network between the OLT device and the ONU device connected in a one-to-one or a one-to-many relationship.

(15) Also, in the above-mentioned present invention (13), the key message generator may insert the specific information cipher key into a vendor specific message of a PLOAM cell, and may cipher the specific information cipher key with the usual key to generate the key message.

Namely, after the specific information cipher key is inserted into a message field of a vendor specific message in a PLOAM cell, the key message generator ciphers the specific information cipher key with the usual key to be outputted as the key message.

Thus, it becomes possible to distribute the specific information cipher key to the destination information reception device prescribed by the ITU-T G.983 or the like.

(16) Also, in the above-mentioned present invention (14), the key message processor may receive the key message as a vendor specific message of a PLOAM cell, and may decipher a message field thereof with the usual key.

Namely, the key message processor deciphers with the usual key e.g. the specific information cipher key included in the message field of a vendor specific message in a received PLOAM cell.

Thus, it is possible for the destination information reception device prescribed by the ITU-T G.983 or the like to receive the specific information cipher key.

(17) Also, in the above-mentioned present invention (15), the usual key may comprise a churning key.

(18) Also, in the above-mentioned present invention (16), the usual key may comprise a churning key.

(19) Also, in the above-mentioned present invention (13), the cipher message generator may insert the specific information into a message field of a PLOAM cell, and may generate the cipher message ciphered with the specific information cipher key.

(20) Also, in the above-mentioned present invention (14), the cipher message processor may decipher a message field of a PLOAM cell received as the cipher message with the specific information cipher key.

(21) Also, in the above-mentioned present invention (15), the information transmission device may further comprise: a setting message generator for generating a setting message including at least any one of cipher setting information indicating whether or not the specific information is set to be ciphered with the specific information cipher key, broadcast setting information indicating whether or not the cipher message should be transmitted by broadcasting, and header mask setting information for designating a specific user cell; and a churn processor for transmitting the specific information inserted into a payload field of a user cell designated by the header mask setting information in forms indicated by the cipher setting information and the broadcast setting information.

Namely, the setting message generator generates a setting message including any one of the cipher setting information indicating whether or not the specific information is ciphered with the specific information cipher key, the broadcast setting information indicating whether or not the cipher message including the specific information is transmitted by broadcasting, and the header mask setting information designating a specific user cell.

The message transmitter transmits the setting message, and notifies to the information reception device a presence/absence of ciphering, a form of a communication, and a designation of a user cell.

Thereafter, the churn processor transmits, in the form indicated by the cipher setting information and the broadcast setting information, the specific information inserted into a payload field of a user cell designated by the header mask setting (header setting and mask setting thereof).

Thus, it becomes possible to transmit a specific user cell in text ciphered with the specific information cipher key or in plain text by unicasting or broadcasting.

(22) Also, in the above-mentioned present invention (16), the information reception device may further comprise: a setting message processor for storing at least any one of cipher setting information included in a setting message received from the source information transmission device and indicating whether or not the specific information is set to be ciphered with the specific information cipher key, broadcast setting information indicating whether or not the cipher message should be transmitted by broadcasting, and header mask setting information for designating a specific user cell; and a dechurn processor for receiving the specific information inserted into a payload field of a user cell designated by the header mask setting information in forms indicated by the cipher setting information and the broadcast setting information.

Namely, the setting message processor receives cipher setting information indicating whether or not the specific information is set to be ciphered with the specific information cipher key, broadcast setting information indicating whether or not the cipher message is transmitted by broadcasting, and header mask setting information for designating a specific user cell, and stores the information.

The dechurn processor receives a user cell designated by the header mask setting information by unicasting or broadcasting indicated by the broadcast setting information, so that the specific information inserted into the payload field of this user cell is extracted in a form indicated by the cipher setting information in deciphered text or in plain text.

Thus, it becomes possible to receive a specific user cell in plain text or ciphered with the specific information cipher key by unicasting or broadcasting.

(23) Also, in the above-mentioned present invention (13), the setting message generator may generate at least any one of cipher setting information, broadcast setting information, header setting information, and group setting information in a message field of a PLOAM cell.

(24) Also, in the above-mentioned present invention (14), the setting message processor may receive at least any one of cipher setting information, broadcast setting information, header setting information, and group setting information included in a message field of a PLOAM cell.

BRIEF DESCRIPTION OF THE DRAWINGS

The above and other objects and advantages of the invention will be apparent upon consideration of the following detailed description, taken in conjunction with the accompanying drawings, in which the reference numbers refer to like parts throughout and in which:

FIG. 1 is a block diagram showing an embodiment of an OLT device in an ATM-PON system which is an information transceiver system according to the present invention;

FIG. 2 is a block diagram showing an embodiment of an ONU device in an ATM-PON system which is an information transceiver system according to the present invention;

FIG. 3 is a format diagram of a down setting message in an ATM-PON system which is an information transceiver system according to the present invention;

FIG. 4 is a format diagram of a unicasting setting message in an ATM-PON system which is an information transceiver system according to the present invention;

FIGS. 18A–18E are diagrams showing an operation example of broadcasting of a vendor specific message in a prior art ATM-PON system.

DESCRIPTION OF THE EMBODIMENTS

Figure 16:
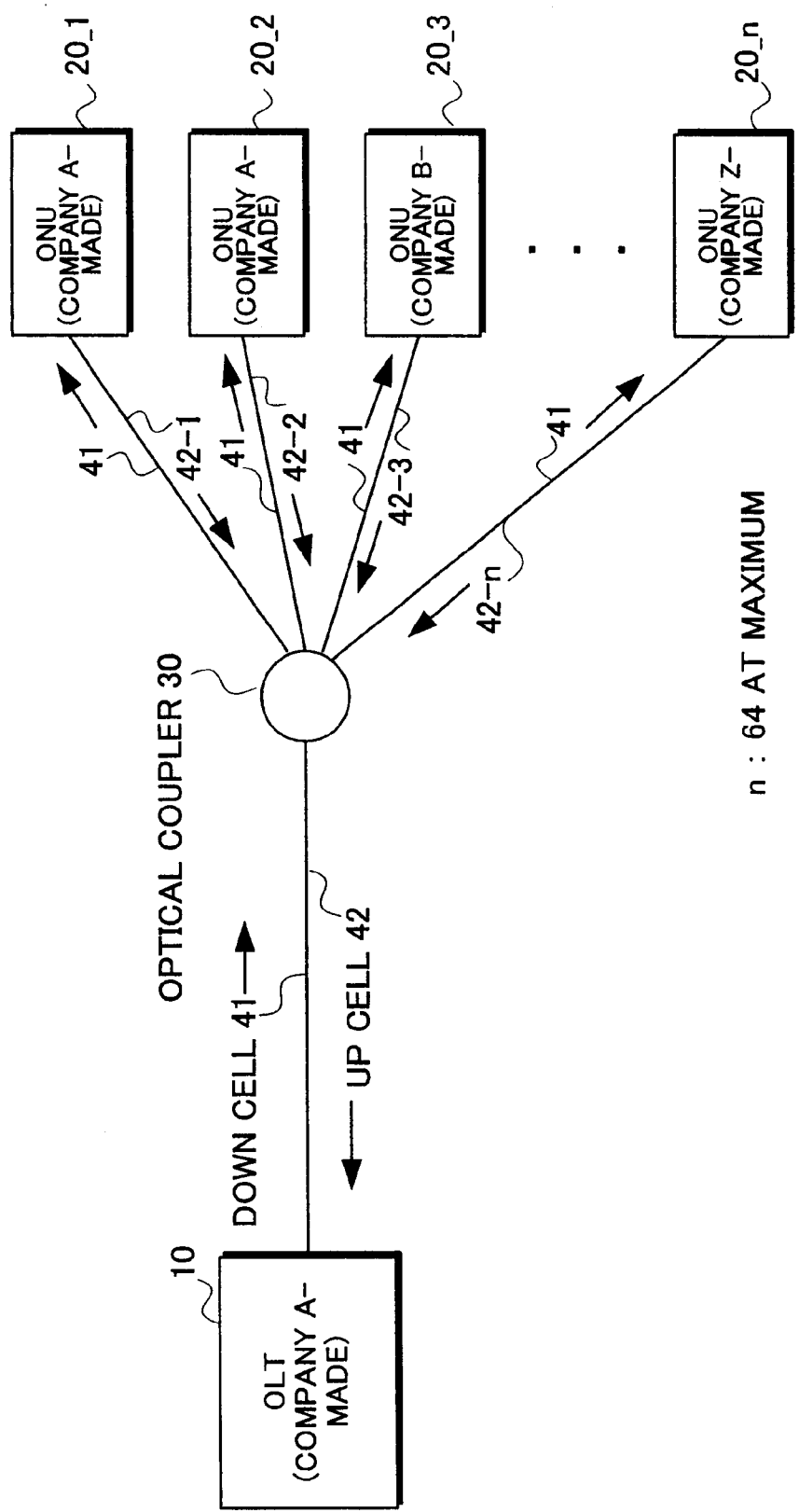
FIG. 16 is a block diagram showing an arrangement of a general ATM-PON system.

Firstly, embodiments of an OLT and an ONU in an ATM-PON system to which an information transceiver system according to the present invention is applied will now be described. In the embodiments, the OLT 10 and the ONU 20 shown in FIGS. 16 and 18 respectively correspond to an information transmission device and an information reception device in the present invention.

FIG. 1 shows an embodiment of the OLT 10 by the present invention.

The OLT 10 is composed of a churn processor 11 for inputting a down user cell 43, a broadcast manager 13 for providing a broadcast user cell transmission request signal 74 to the churn processor 11, a setting message generator 14, a key message generator 15, a broadcast message generator 16, and a usual message generator 17 to which a setting message transmission request signal 75, a key message transmission request signal 76, and a broadcast message transmission request signal 77 are respectively provided from the broadcast manager 13, a PLOAM cell generator 18 for receiving signals from the generators 14–17, and a down cell multiplexer 12 for receiving the user cell 43 and a PLOAM cell 44 respectively from the churn processor 11 and the generator 18 and for outputting a down cell 41.

Also, the broadcast manager 13 includes a broadcast management table 19, which stores setting information of a destination PON-ID, a group ID, a broadcast cipher key, a broadcast type setting, a cipher setting, a broadcast setting, a vendor setting, a group setting, a header setting, and a mask setting.

FIG. 2 shows an embodiment of the ONU 20 according to the present invention.

Figure 17:
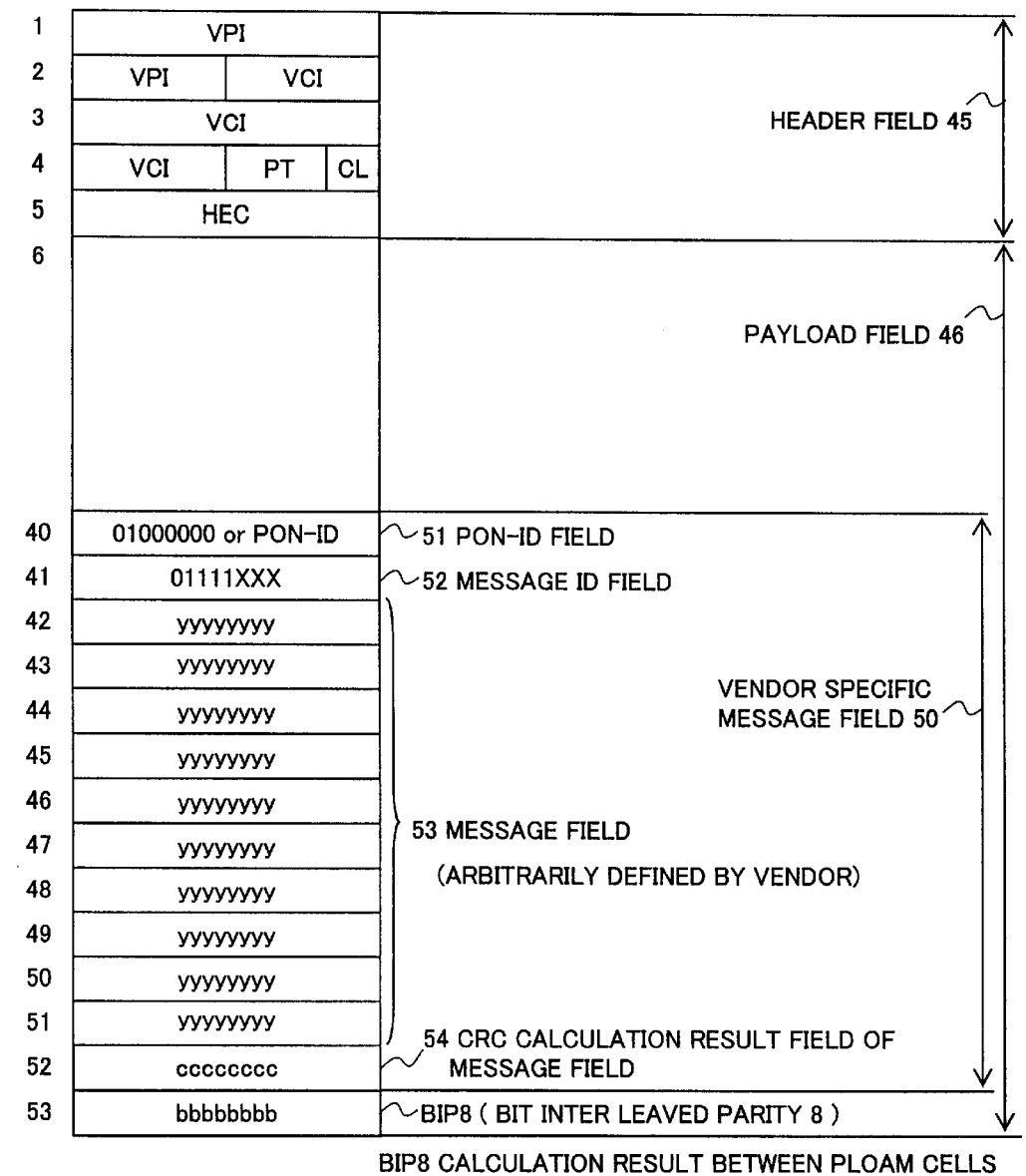
FIG. 17 is a format diagram of a down PLOAM cell in a general ATM-PON system.

This ONU 20 is composed of a dechurn processor 21 for inputting the user cell 43 in the down cell 41 and for outputting the user cell 43, a message terminator 23 for inputting the PLOAM cell 44 and for outputting a vendor specific message 50 (see FIG. 17) and other messages, a setting message processor 24 for commonly receiving the message 50, a key message processor 25, a broadcast message processor 26, a usual message processor 27, and a broadcast manager 22 for receiving signals from the processors 24–26 and for transmitting/receiving the signals to/from the dechurn processor 21.

Also, the broadcast manager 22 includes a unicast management table 28 and a broadcast management table 29. The unicast management table 28 stores the broadcast setting and the cipher setting. The broadcast management table 29 stores the group ID, the broadcast type setting, the broadcast setting, the cipher setting, and the header mask setting.

Hereinafter, a setting message 71, a key message 72, a cipher message 73 set in the vendor specific message 50 of the PLOAM cell 44 in the ATM-PON system will be described referring to FIGS. 3–11.

It is to be noted that the message 50, accordingly the messages 71–73 are arranged in 13 octets of octet Nos. "40"–"52" of the PLOAM cell.

Also, since a PON-ID field 51 of octet No. "40" and a CRC calculation result field 54 of octet No. "52" in the messages 71–73 are the same as those in the message 50, the description will be omitted.

FIG. 3 shows a format of the setting message 71. In the message ID field 52 of the message 71, "01111000=0×78" is set. Namely, higher significant 5 bits="01111" designating the vendor specific message 50 and lower significant 3 bits="000" indicating the setting message 71 are set.

A message field 53 is composed of a group ID field 55 of octet No. "42", a broadcast cipher setting field 56 of octet No. "43", and a field of octet Nos. "44"–"51" having different contents depending on values set in the field 56.

The group ID="mmmmmmmm" is a group identifier in case where arbitrary plural ONU's 20 are made to form a single group.

"SSSSS" in the broadcast cipher setting field 56="SSSSSXGC" is a broadcast type setting and indicates the type of the broadcast. "X" indicates "Don't care", and "G" is a broadcast setting bit for setting whether or not broadcasting designated by the "SSSSS" should be performed. "G"="1: valid" designates that the broadcasting should be performed, and "G"="0: invalid" designates that the broadcasting should not be performed.

"C" is a cipher setting bit for setting whether or not the ciphering of the broadcasting designated by the "SSSSS" should be performed. "C"="1: valid" designates that the ciphering should be performed, and "C"="0: invalid" designates that the ciphering should not be performed.

FIGS. 4–8 respectively show setting messages 71_1–71_5 to which the setting message 71 shown in FIG. 3 is applied. The contents of the octet Nos. "41" and "42" are the same as those of the message 71.

The setting message 71_1 in FIG. 4 is a message for setting a PLOAM cell unicasting, where "00001" indicating the message 71_1 is set in the "SSSSS" of the broadcast cipher setting field 56. The group ID field 55 of the octet No. "42" and a broadcast setting G bit of the octet No. "43" are not used, and the field of the octet Nos. "44"–"51" is not used.

Figure 5:
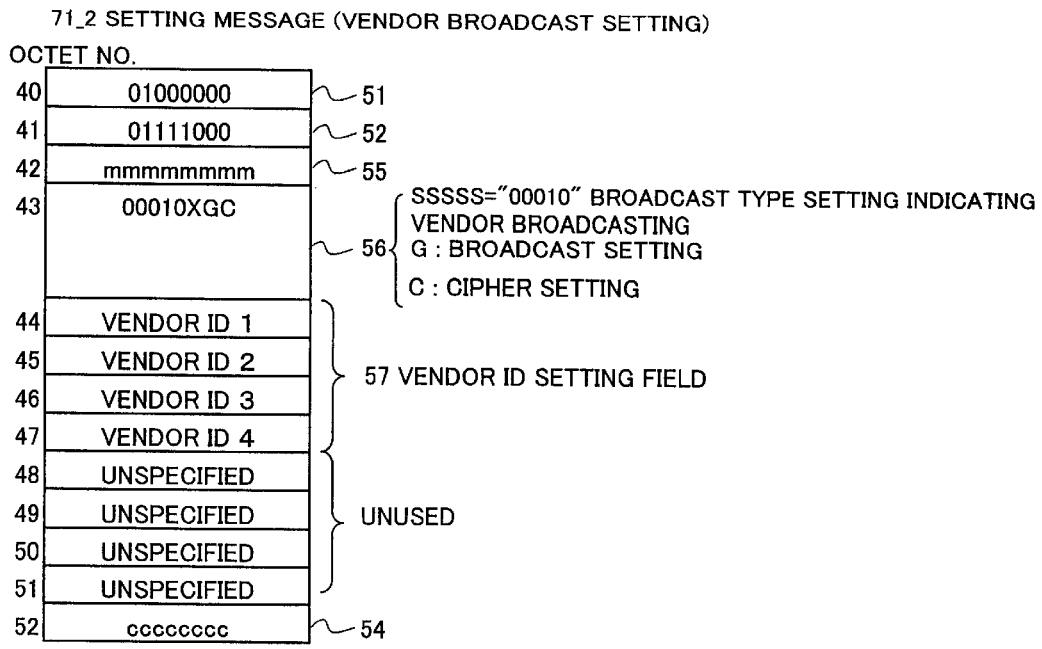
FIG. 5 is a format diagram of a vendor broadcasting setting message in an ATM-PON system which is an information transceiver system according to the present invention.

The setting message 71_2 in FIG. 5 is a message for setting a PLOAM cell vendor broadcasting, where "00010" indicating the message 71_2 is set in the "SSSSS". The octet Nos. "44"–"47" are a vendor ID setting field 57, where a 32-bit vendor ID indicating the ONU's 20 which belong to the group of the group ID indicated by the group ID field 55 is set. The field of the octet Nos. "48"–"51" is not used.

It is to be noted that while the group ID for setting a vendor is used in this embodiment, a vendor ID itself may be used.

Figure 6:
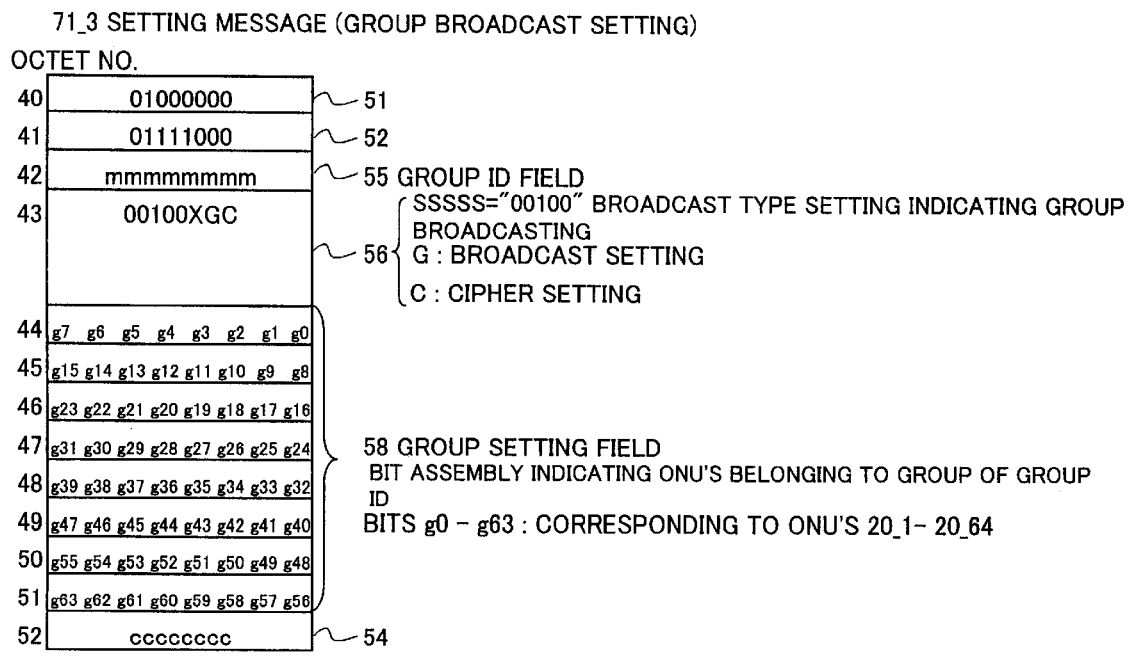
FIG. 6 is a format diagram of a group broadcasting setting message in an ATM-PON system which is an information transceiver system according to the present invention.

The setting message 71_3 in FIG. 6 is a message for setting a PLOAM cell group broadcasting, where "00100" indicating the message 71_3 is set in the "SSSSS". The octet Nos. "44"–"51" are a group setting field 58, where a bit assembly of g0–g63 indicating the ONU's 20 which belong to the group of the group ID indicated by the group ID field 55 is set.

When g17="1" for example, the ONU 20 of the PON-ID="17 (decimal)" belongs to a group designated by the group ID field.

Figure 7:
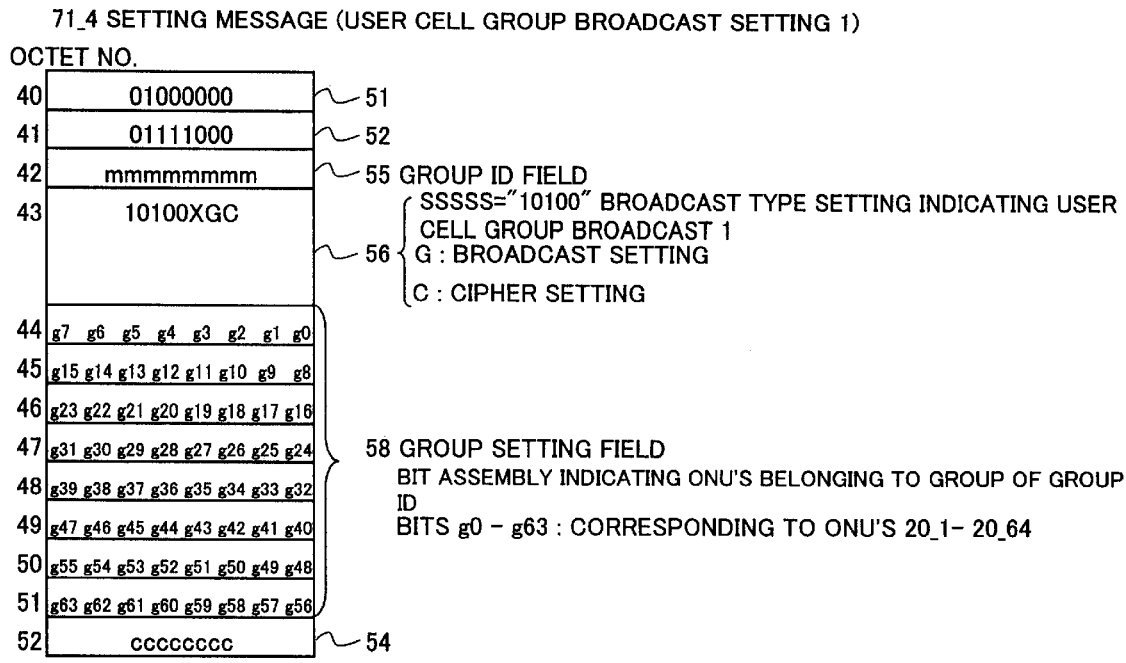
FIG. 7 is a format diagram of a user cell group broadcasting setting message (1) in an ATM-PON system which is an information transceiver system according to the present invention.

The setting message 71_4 in FIG. 7 is a message for setting a user cell group broadcast setting 1, where "10100" indicating the message 71_4 is set in the "SSSSS". The field of the octet Nos. "44"–"51" is the same as that of the setting message 71_3 in FIG. 6.

Figure 8:
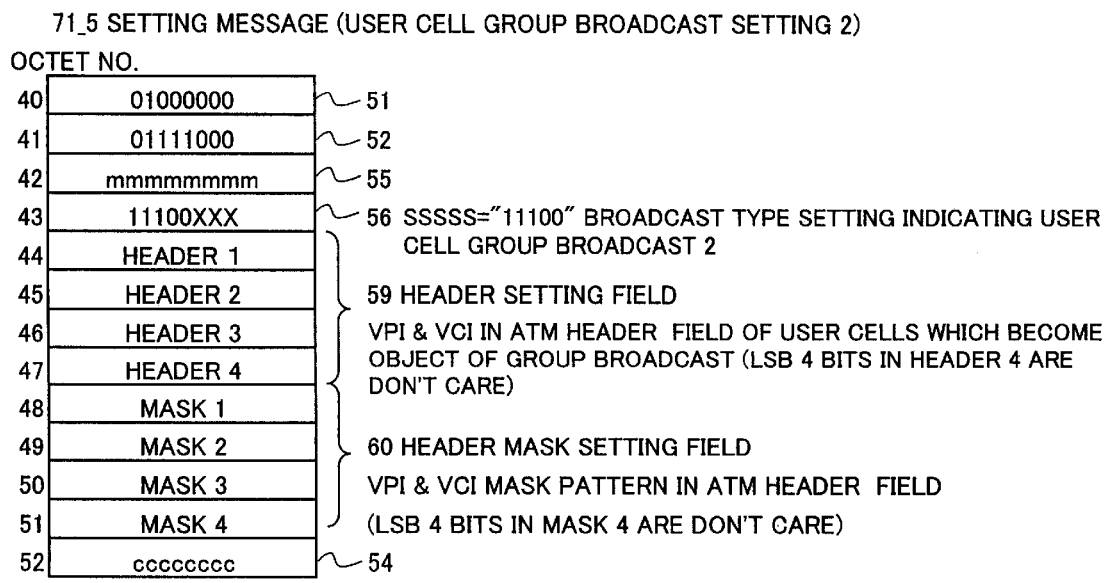
FIG. 8 is a format diagram of a user cell group broadcasting setting message (2) in an ATM-PON system which is an information transceiver system according to the present invention.

The setting message 71_5 in FIG. 8 is a message for setting a user cell group broadcast setting 2, where "11100" indicating the message 71_5 is set in the "SSSSS". "GC" is "XX: Don't care".

The octet Nos. "44"–"47" are a header setting field 59. The VPI and VCI (see FIG. 17) of the octet Nos. "1"–"4" in the header field of the user cell for the object of the group broadcasting are set in the headers 1–4 of the field 59.

The octet Nos. "48"–"51" are a header mask setting field 60, and mask patterns of the VPI and the VCI are set in masks 1–4 of the field 60. It is to be noted that 4 least significant bits (LSB) of the header 4 and the mask 4 indicate "Don't care".

Figure 9:
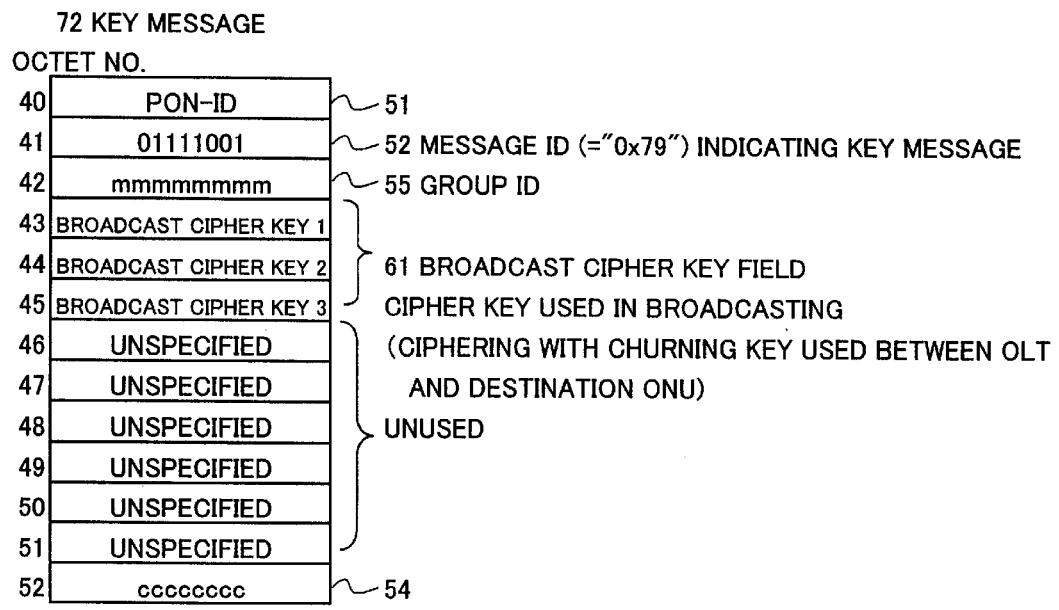
FIG. 9 is a format diagram of a key message in an ATM-PON system which is an information transceiver system according to the present invention.

The key message 72 in FIG. 9 is a message for transmitting the broadcast cipher key, and indicates the key message by setting a message ID="01111001=0×79". The octet Nos.

"43"–"45" are a broadcast cipher key field 61. 24-bit broadcast cipher key is set in the broadcast cipher keys 1–3 of the field 61. The octet Nos. "46"–"51" are not used.

Figure 10:
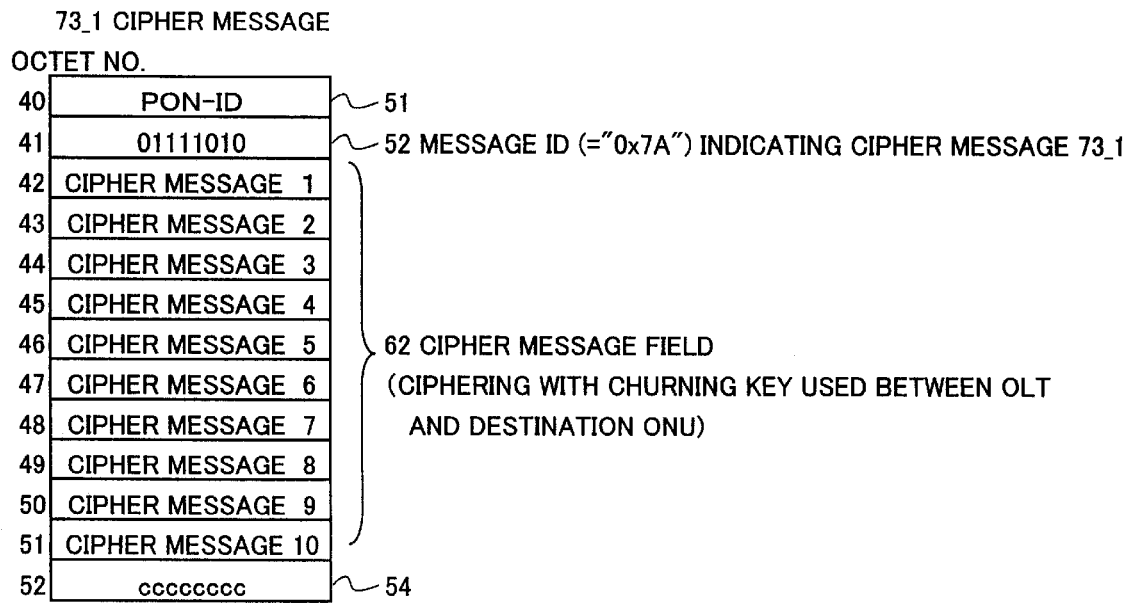
FIG. 10 is a format diagram of a unicasting cipher message in an ATM-PON system which is an information transceiver system according to the present invention.

A cipher message 73_1 in FIG. 10 is a message in which the message is ciphered with a churning key to be transmitted. The message ID="01111010" indicating the cipher message is set in the message ID field 52.

When the PON-ID indicates that a message is addressed to a specific ONU, the octet Nos. "42"–"51" are a cipher message field 62. A message, ciphered with the churning key, to be transmitted is inserted into cipher messages 1–10 of the field 62.

Figure 11:
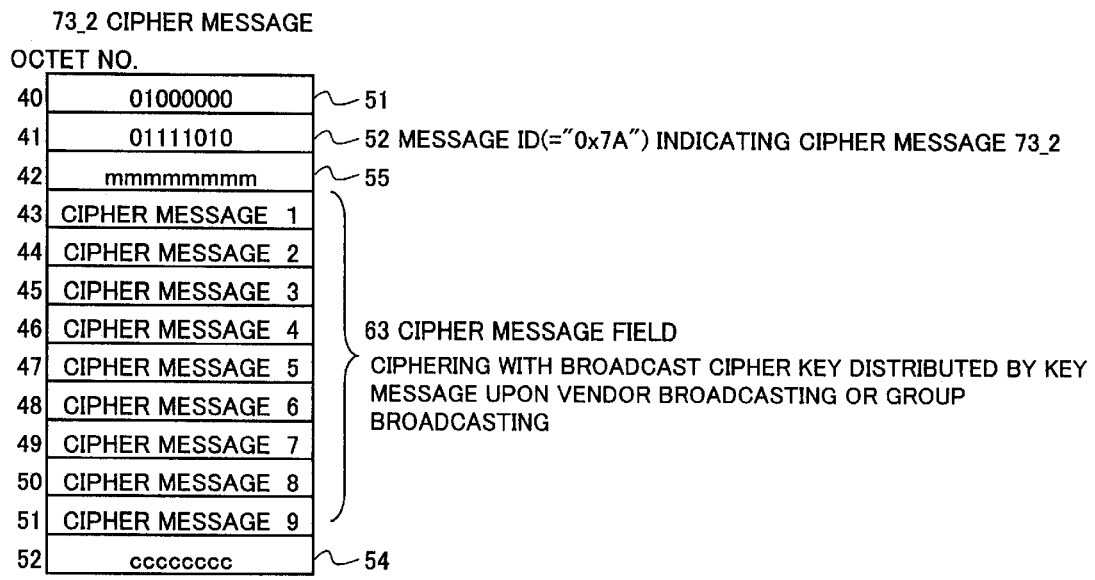
FIG. 11 is a format diagram of a vendor broadcasting or a group broadcasting cipher message in an ATM-PON system which is an information transceiver system according to the present invention.

A cipher message 73_2 in FIG. 11 is a broadcast message in which the message is ciphered with the broadcast cipher key and is transmitted in case of vendor broadcasting or group broadcasting. The PON-ID indicates that the message is addressed to all of the ONU devices. The message ID="01111010" indicating the cipher message is set in the message ID field 52. The group ID indicating a group is set in the group ID field 55.

The message, ciphered with the broadcast cipher key, to be transmitted is inserted into the cipher messages 1–9 of a cipher message field 63 of the octet Nos. "43"–"51".

FIGS. 12–15 show examples of a cell transmission operation from the OLT 10 in FIG. 1 to the ONU 20 in FIG. 2 using the messages 71–73 of FIGS. 3–11.

Namely, FIGS. 12–15 respectively show operation examples of [1] unicasting of vendor specific message of PLOAM cell, [2] vendor broadcasting, [3] group broadcasting, and [4] group broadcasting by user cell. In FIGS. 12–15, the operations in case where ciphering is performed and ciphering is not performed depending on the setting message 71.

Also, FIGS. 12A, 13A, 14A, and 15A show a PLOAM cell 44 (including user cell 43 in FIG. 15A) transmitted by the OLT 10. FIGS. 12B–15B, FIGS. 12C–15C, FIGS. 12D–15D, and FIGS. 12E–15E respectively show the operation examples when the ONU's 20_1, 20_2, 20_3, and 20_4 (occasionally, represented by a reference numeral 20) receive the PLOAM cell 44 (including the user cell 43 in FIG. 15).

It is to be noted that the PON-ID which designates all of the ONU's is "0x40", and the PON-ID's of the ONU's 20_1–20_4 are respectively "0x00", "0x01", "0x02", and "0x03".

Also, the ONU's 20_1 and 20_2 are supposed to be made by a company A, the ONU 20_3 to be made by a company B, and the ONU 20_4 to be made by a company C.

Also, FIGS. 12F–15F show setting contents of the vendor specific messages (i.e. messages 71–73) included in the PLOAM cell 44. It is to be noted that in FIGS. 12F–15F, the CRC calculation result field is omitted.

Hereinafter, the operation examples shown in FIGS. 12–15 will be described referring to FIGS. 1, 2, 4–11.

Figure 12:
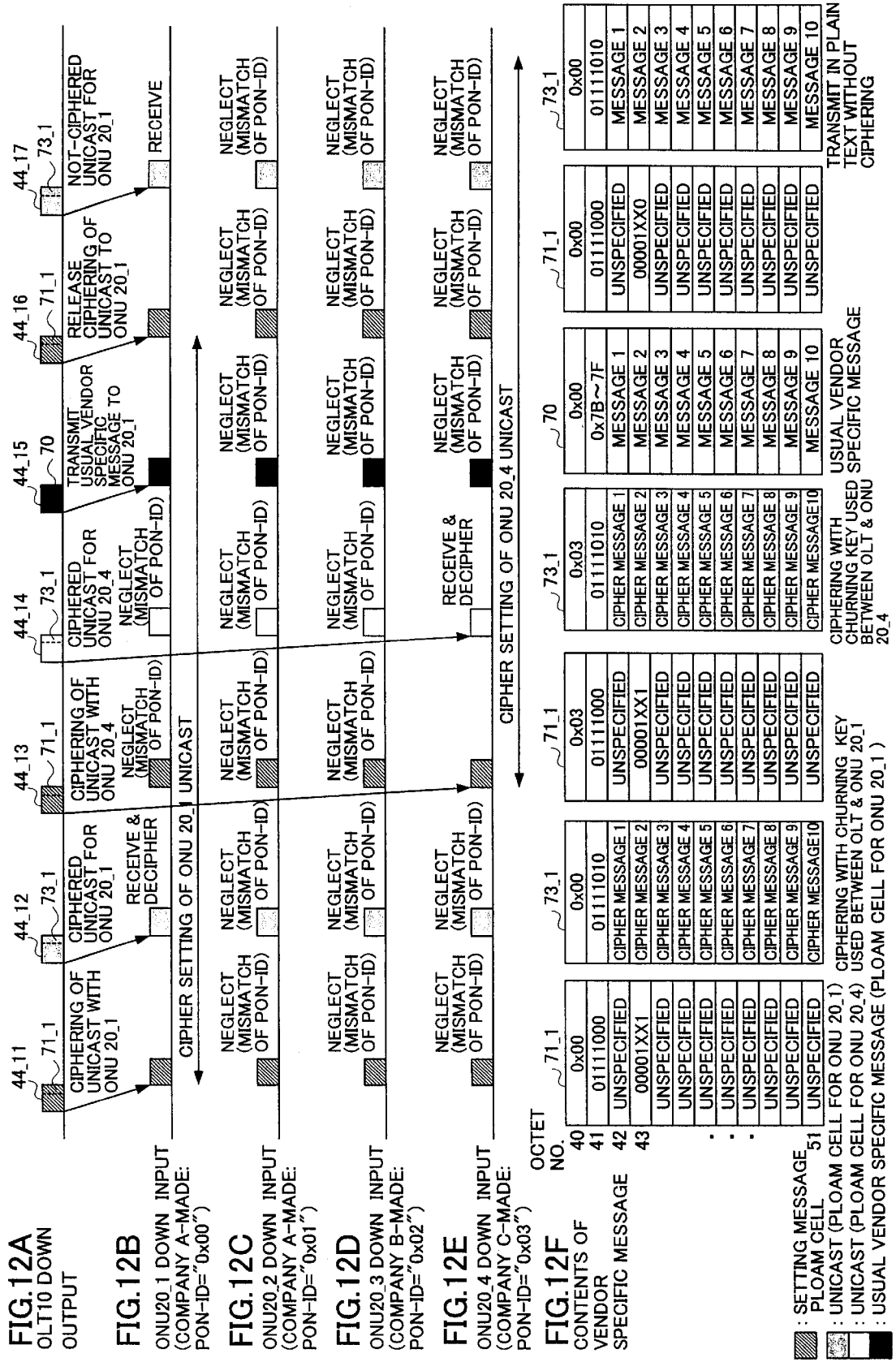
FIGS. 12A–12F are diagrams showing an operation example of unicasting in an ATM-PON system which is an information transceiver system according to the present invention.

[1] The operation upon unicasting the PLOAM cell by the vendor specific message of the PLOAM cell in FIG. 12 will now be described.

① Description of PLOAM Cell 44_11:

In FIG. 1, when a setting request of ciphering the PLOAM cell unicasting occurs for the ONU 20_1, the broadcast manager 13 in the OLT 10 writes predetermined setting information in the broadcast management table 29, and provides to the setting message generator 14 the setting message transmission request signal 75, a PON-ID 81="0x00" of the destination ONU 20_1, and broadcast cipher setting information 84 indicating the unicasting and the ciphering.

The generator 14 generates the setting message 71_1 (see FIG. 4) in which the PON-ID="0x00" of the destination ONU 20_1 and the message ID="0x78" indicating the setting message are respectively set in the octet Nos. "40" and "41", unicasting="00001" is set in the broadcast type setting of the octet No. "43", and "1: valid (cipher)" is set in a cipher setting C bit. Then, the generator 14 provides the message 71_1 to the PLOAM cell generator 18.

It is to be noted that other unused octets and unused bits of the setting message 71_1 are "Don't care", and anything may be put therein.

The generator 18 generates the PLOAM cell 44_1 including the message 71_1 to be provided to the down cell multiplexer 12 at a predetermined timing. The down cell multiplexer 12 transmits the PLOAM cell 44_11 to the ONU 20_1. FIG. 12F shows the setting message 71_1.

In FIG. 2, the message terminator 23 of the ONU 20_1 recognizes that the message 71_1 is a setting message and transmits the same to the setting message processor 24 since the PON-ID of the received message 71_1 matches its own PON-ID and the message ID="0x78".

The processor 24 transmits the broadcast cipher setting signal 84 including "unicasting" and "ciphering" set in the message 71_1 to the broadcast manager 22.

The broadcast manager 22 writes the "unicasting" and the "ciphering" settings in the unicast management table 28.

On the other hand, the processor 23 in each of the ONU's 20_2–20_4 discards the message 71_1 since the PON-ID included in the message 71_1 does not match its own PON-ID.

② Description of PLOAM Cell 44_12:

After transmitting the setting message 71_1 to the ONU 20_1 in FIG. 1, the broadcast manager 13 in the OLT 10 provides to the broadcast message generator 16 the broadcast message transmission request signal 77, the PON-ID="0x00" of the ONU 20_1, and the broadcast cipher setting signal 84 indicating the unicasting and the cipher setting="valid".

Since the PON-ID="0x00" is within "0x00"–"0x3F" and the unicasting and the cipher setting="valid", the generator 16 recognizes that the broadcast message transmission request signal 77 is a transmission request of the cipher message 73_1, and transmits the PON-ID 81 of the ONU 20_1 to the churn processor 11.

The churn processor 11 returns to the generator 16 the churning key 88 which is a usual key used between the OLT 10 and the ONU 20_1 corresponding to the PON-ID 81.

The generator 16 generates the cipher message 73_1 in which the PON-ID="0x00" of the ONU 20_1 and the message ID="0x7A" indicating the cipher message are respectively set in the octet Nos. "40" and "41", and the cipher messages 1–10 ciphered with the churning key are included in the octet Nos. "42"–"51" (see FIG. 10). Then, the generator 16 provides the cipher message 73_1 to the PLOAM cell generator 18.

The generator 18 generates the PLOAM cell 44_12 including the cipher message 73_1 to be provided to the down cell multiplexer 12. The down cell multiplexer 12 transmits the PLOAM cell 44_12 to the ONU 20_1.

It is to be noted that since the churning/dechurning is performed to the message by the churning key defined in the G.983 in this embodiment of the unicasting, the broadcast cipher key which is a specific information cipher key is not required, so that the key message 72 is not generated.

However, in case of the unicasting, it is also possible to generate the broadcast cipher key, to transmit the same to the ONU 20_1, and to transmit the cipher message ciphered with the broadcast cipher key.

Also, it is possible to simply performing the ciphering with the churning key or the broadcast cipher key by using an EXOR mask or the like.

In FIG. 2, the ONU 20_1 transmits the cipher message 73_1 of the received PLOAM cell 44_12 to the message terminator 23, and recognizes that the message is a cipher message addressed to its own device since the PON-ID matches the PON-ID="0×00" of its own device and the message ID="0×7A". The ONU 20_1 transmits the cipher message 73_1 to the broadcast message processor 26.

Since the PON-ID fails to match the PON-ID="0×40" of all the ONU's but with the PON-ID="0×00" of its own device, the processor 26 determines that the message is the cipher message 73_1 of the unicasting, and provides the PON-ID 81 to the broadcast manager 22.

The broadcast manager 22 provides the PON-ID 81="0×00" of the ONU 20_1 to the dechurn processor 21, so that the dechurn processor 21 returns the churning key 88 used between the OLT 10 and the ONU 20_1. The broadcast manager 22 returns to the processor 25 the churning key 88, the broadcast type setting="unicast" in the unicast management table 28, and the cipher setting="valid".

Since the broadcast type setting="unicasting" and the cipher setting="valid", the processor 26 deciphers the cipher messages 1–10 of the octet Nos. "42"–"51" with the churning key 88.

③ Description of PLOAM Cell 44_13:

Similarly, when performing the unicast with the ONU 20_4, the OLT 10 sets the PON-ID="0×03" of the ONU 20_4 in the PON-ID field, and transmits to the ONU 20_4 the PLOAM cell 44_13 including the setting message 71_1 in which the broadcast type setting is set to "unicasting" and the cipher setting is set to "ciphering".

④ Description of PLOAM Cell 44_14:

Thereafter, the OLT 10 has only to transmit to the ONU 20_4 the PLOAM cell 44_14 including the cipher message 73_1 in which the PON-ID field="0×03" is set.

⑤ Description of PLOAM Cell 44_15:

Also, when transmitting to the ONU 20_1 a message not ciphered but in plain text, the OLT 10 sets the PON-ID= "0×00" of the ONU 20_1 in the PON-ID field 51 of the octet No. "40", sets data of "0×7B"–"0×7F" in the octet No. "41", and transmits the PLOAM cell 44_15 including the usual vendor specific message 50 (see FIG. 17) in which the messages 1–10 in plain text are inserted into the octet Nos. "42"–"51".

In FIG. 2, the message terminator 23 receives the message 50 included in the PLOAM cell 44_15, and performs processing for another message since the message ID="0×7B"–"0×7F". Namely, the message terminator 23 receives the message in plain text without being deciphered as the usual vendor specific message 50.

Thus, except the vendor specific messages 71–73 of the message ID's="0×78"–"0×7A" shown in FIGS. 3–11, the usual vendor specific messages 50 of the message ID's="0×7B"–"0×7F" can be received regardless of setting states of the broadcast type setting, the broadcast setting, and the cipher setting.

⑥ Description of PLOAM Cell 44_16:

Also, when releasing the ciphering for the unicasting with the ONU 20_1, the OLT 10 transmits to the ONU 20_1 the PLOAM cell 44_16 including the message 71_1 in which the cipher setting C bit of the octet No. "43" in the message 71_1 of the PLOAM cell 44_11 transmitted for setting the ciphering is changed to "0: invalid (not ciphering)".

The cipher setting of the unicast management table 28 in the ONU 20_1 having received the message 71_1 is set to "invalid".

⑦ Description of PLOAM Cell 44_17:

Thereafter, the OLT 10 has only to transmit to the ONU 20_1 the PLOAM cell 44_17 including the cipher message 73_1 in which the PON-ID is made the PON-ID="0×00" of the ONU 20_1, and the message in plain text is set in the octet Nos. "42"–"51".

[2] Hereinafter, the operation of a PLOAM cell vendor broadcasting by a vendor specific message of a PLOAM cell in FIG. 13 will be described.

① Description of PLOAM Cell 44_21:

In FIG. 1, the broadcast manager 13 of the OLT 10 receives a setting request of a vendor (e.g. company A) broadcasting, and writes predetermined setting information in the broadcast management table 19. Then, the broadcast manager 13 provides to the generator 14 the setting message transmission request signal 75, a vendor ID 85 of the ONU's 20_1 and 20_2 made by the company A which perform a vendor broadcasting, a group ID 82 (e.g. "0×11") indicating a management No. of the vendor broadcasting, and the broadcast cipher setting signal 84 indicating the vendor broadcast setting and the cipher setting.

It is to be noted that the broadcast manager 13 writes and saves in the broadcast management table 19 a broadcast cipher key 83 prepared from a self-running counter or the like (not shown) when the setting request has occurred.

The generator 14 generates the setting message 71_2 (see FIG. 5) in which all of the PON-ID's="0×40", the message ID="0×78", and the group ID="0×11" are respectively set in the octet Nos. "40", "41", and "42", the broadcast type setting="00010 (=vendor broadcast)", the broadcast setting G bit="valid", and the ciphering C bit="valid" are set in the octet No. "43", and the 32-bit vendor ID 85 (vendor ID's 1–4) is set in the octet Nos. "44"–"47". The generator 14 provides the setting message 71_2 to the PLOAM cell generator 18.

The message 71_2 is inserted into the PLOAM cell 44_21 through the generator 18 and the down cell multiplexer 12 to be transmitted.

In FIG. 2, each of the ONU's 20_1–20_4 transmits the received PLOAM cell 44_21 to the message terminator 23, and recognizes that the message 71_2 is a setting message since the PON-ID is addressed to all of the ONU's and the message ID="0×78". Then, each of the ONU's 20_1–20_4 transmits the message 71_2 to the setting message processor 24.

Since the broadcast type setting is for vendor broadcasting, the processor 24 determines whether or not the vendor ID which performs vendor broadcasting matches the vendor ID of its own device.

The processor 24 in each of the ONU's 20_3 and 20_4 without matching vendor ID discards the message 71_2.

The processor 24 in each of the ONU's 20_1 and 20_2 having the matching vendor ID recognizes that its own device is the object of the vendor broadcasting, and provides to the broadcast manager 22 the broadcast cipher setting signal 84 including the group ID 82, the broadcast type setting="vendor broadcasting", the broadcast setting, and the cipher setting.

The broadcast manager 22 stores in the broadcast management table 29 the information of the group ID 82, the broadcast type setting, the broadcast setting, and the cipher setting. As a result, the information is stored in the broadcast management table 29 only in the ONU's 20_1 and 20_2.

② Description of PLOAM Cell 44_22:

The broadcast manager 13 in the OLT 10 provides to the key message generator 15 the key message transmission request signal 76, the group ID 82="0×11", and the broadcast cipher key 83.

The key message generator 15 provides to the churn processor 11 the PON-ID 81 of the ONU's 20_1 and 20_2 to which the vendor broadcasting is performed. The churn processor 11 returns to the generator 14 the churning key 88 used between the ONU's 20 corresponding to the PON-ID.

The generator 14 firstly generates the key message 72 (see FIG. 9) in which the PON-ID="0×00" of the ONU 20_1 to which the vendor broadcasting is performed, the message ID="0×79" indicating the key message 72, and the group ID="0×11" are respectively set in the octet Nos. "40", "41", and "42", and the broadcast cipher key 83 ciphered with the churning key 88 used between its own device and the destination ONU 20_1 is inserted into the octet Nos. "43"–"45". Then, the generator 14 transmits the key message 72 included in the PLOAM cell 44_22 to the ONU 20_1 through the PLOAM cell generator 18 and the down cell multiplexer 12.

③ Description of PLOAM Cell 44_23:

Similarly, the OLT 10 transmits to the ONU 20_2 the broadcast cipher key 83 ciphered with the churning key 88 used between its own device and the ONU 20_2 by the PLOAM cell 44_23.

It is to be noted that the OLT 10 prepares the broadcast cipher key at fixed intervals in order to prevent the broadcast cipher key from being decoded, and distributes the broadcast cipher key to the ONU's 20_1 and 20_2.

The message terminator 23 in each of the ONU's 20_1 and 20_2 respectively compares the PON-ID of its own device with the PON-ID of the key message 72, receives the matched key message 72, recognizes the key message since the message ID is "0×79", and transmits the key message to the key message processor 25.

The processor 25 deciphers the broadcast cipher key 83 with the churning key 88 used, and provides the group ID 82 and the broadcast cipher key 83 to the broadcast manager 22. The broadcast manager 22 stores the combination of the group ID 82 and the broadcast cipher key 83 in the broadcast management table 29.

④ Description of PLOAM Cell 44_24:

The broadcast message generator 16 in the OLT 10 receives from the broadcast manager 13 the broadcast message transmission request signal 77, the group ID, and the setting information corresponding thereto, and performs the following processing.

Namely, the generator 16 generates the cipher message 73_2 (see FIG. 11) in which the PON-ID="0×40" addressed to all of the ONU's, the message ID="0×7A" indicating the cipher message, and the group ID "0×11" corresponding to the vendor broadcasting are respectively set in the octet Nos. "40", "41", and "42", and 9-octet cipher messages 1–9 ciphered with the broadcast cipher key are inserted into the octet Nos. "43"–"51".

The cipher message 73_2 is inserted into the PLOAM cell 44_24 through the generator 18 and the multiplexer 12 to be transmitted.

The message terminator 23 in each of the ONU's 20_1–20_4 terminates the PLOAM cell 44_24, and transmits the cipher message 73_2 included in the PLOAM cell 44_24 to the broadcast message processor 26 since the PON-ID is addressed to all of the ONU's and the message ID="0×7A".

The broadcast message processor 26 transmits the group ID "0×11" included in the cipher message 73_2 to the broadcast management table 29 of the broadcast manager 22, and then reads the broadcast cipher setting signal 84 including the broadcast setting and the cipher setting corresponding to the group ID 82, and the broadcast cipher key 83.

When both of the broadcast setting and the cipher setting are "valid", the processor 26 deciphers the cipher messages 1–9 of the octet Nos. "43"–"51" with the broadcast cipher key 83. When the broadcast setting is "invalid", the processor 26 discards the cipher message 73_2.

As a result, only the ONU's 20_1 and 20_2 receive the cipher message 73_2.

⑤ Description of PLOAM Cell 44_25:

When releasing the ciphering, the setting message processor 24 in the OLT 10 inserts into the PLOAM cell 44_25 the setting message 71_2 in which the cipher setting C bit of the octet No. "43" in the message 71_2 included in the PLOAM cell 44_21 is changed to "0: invalid". Then, the setting message processor 24 transmits the PLOAM cell 44_25.

Each of the ONU's 20_1 and 20_2 having received the message performs the same operation upon receiving the PLOAM cell 44_21, and makes the cipher setting corresponding to the group ID=0×11 in the broadcast management table 29 "invalid".

⑥ Description of PLOAM Cell 44_26:

The OLT 10 transmits, by the same operation upon transmitting the cipher message 73_2 included in the PLOAM cell 44_24, the PLOAM cell 44_26 including the cipher message 73_2 in which the messages 1–9, not ciphered with the broadcast cipher key 83 different from the former cipher message 73_2, are inserted into the octet Nos. "43"–"51".

Each of the ONU's 20_1 and 20_2 receives the PLOAM cell 44_26 by the same operation as the operation upon the reception of the cipher message 73_2 included in the PLOAM cell 44_24, and receives the messages 1–9 of the octet Nos. "43"–"51" in plain text without being deciphered since the broadcast setting in the broadcast management table 29="valid" and the cipher setting="invalid".

Thus, it becomes possible to omit the ciphering procedure when the message to be transmitted is less significant and the ciphering of the contents is not required.

⑦ Description of PLOAM Cell 44_27:

When releasing the vendor broadcasting, the setting message processor 24 in the OLT 10 transmits the PLOAM cell 44_27 including the setting message 71_2 in which only the broadcast setting bit of the octet No. "43" in the message 71_2 included in the PLOAM cell 44_21 is changed to "0 (invalid)".

Each of the ONU's 20_1 and 20_2 having received this setting message 71_2 performs the same operation as the operation upon the reception of the PLOAM cell 44_21 to make the broadcast setting of the broadcast management table 29 "invalid".

Each of the ONU's 20_1 and 20_2 receives the cipher message 73_2 included in the PLOAM cell by the same operation as the operation upon receiving the cipher message 73_2 included in the PLOAM cell 44_24. However, since the broadcast setting in the broadcast management table 29="invalid", the ONU's 20_1 and 20_2 discard the cipher message 73_2.

Figure 14:
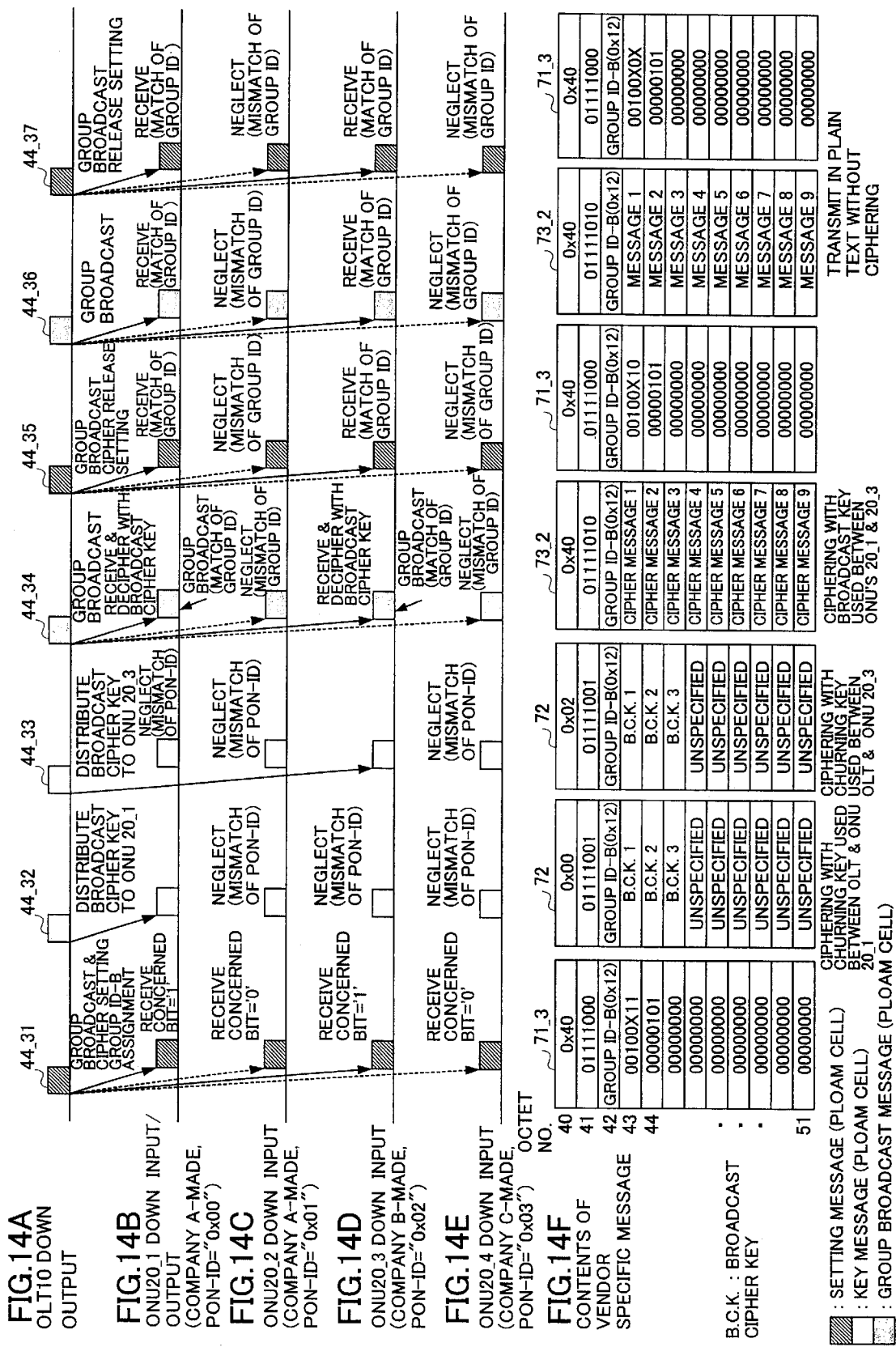
FIGS. 14A–14F are diagrams showing an operation example of group broadcasting in an ATM-PON system which is an information transceiver system according to the present invention.

[3] Hereinafter, the operation of the PLOAM cell group broadcast by the vendor specific message of the PLOAM cell in FIG. 14 will be described.

① Description of PLOAM Cell 44_31:

When the setting request of the group broadcast ciphering occurs, the broadcast manager 13 in the OLT 10 writes and saves the setting information in the broadcast management table 19, in the same way as the case of the setting request of the vendor broadcast ciphering.

The broadcast manager 13 provides to the generator 14 the setting message transmission request signal 75, the PON-ID 81 of the ONU's 20 which belong to the group, the group ID 82, the broadcast cipher key 83, and the broadcast cipher setting signal 84.

The generator 14 generates the setting message 71_3 (see FIG. 6) in which the PON-ID="0×40" addressed to all of the ONU's, the message ID="0×78" indicating the setting message, and the group ID=e.g. "0×12" are respectively set in the octet Nos. "40", "41", and "42", "00100" indicating the group broadcasting, and "1" indicating "valid" for both of the broadcast setting and the cipher setting are set in the broadcast type setting of the octet No. "43", and 64-bit group setting (data="00000101" of the octet No. "44" and data="00000000" of octet Nos. "45"–"51") indicating the combination of the ONU's 20_1 and 20_3 which perform the group broadcasting is set in the group setting field 58 of the octet Nos. "44"–"51".

This setting message 71_3 is inserted into the PLOAM cell 44_31 through the generator 18 and the down cell multiplexer 12 to be transmitted.

The message terminator 23 in each of the ONU's 20_1–20_4 terminates the messages 71-3 included in the received PLOAM cells 44_31, so that the message 71_3 is transmitted to the message processors 24 since the PON-ID="0×40 (=addressed to all of the ONU's)" and the message ID="0×78".

The message processor 24 in each of the ONU's 20_1 and 20_3 reads the bit corresponding to its own device within the 64 bit of the group setting field 58, and determines that its own device is the object of the group broadcasting since the bit is "1". Then, the message processor 24 transmits to the broadcast manager 22 the broadcast cipher setting signal 84 including the group ID 82, the broadcast type setting, the broadcast setting, and the cipher setting.

The processor 24 in each of the ONU's 20_2 and 20_4 determines that its own device is not the object of the group broadcasting since the bit corresponding to its own device is "0", and discards the message 71_3.

The broadcast manager 22 writes and saves the group ID 82, the broadcast type setting, the broadcast setting, and the cipher setting in the broadcast management table 29.

② Description of PLOAM Cells 44_32 and 44_33:

The key message generator 15 in the OLT 10 receives from the broadcast manager 13 the key message transmission request signal 76, the group ID 82, and the setting information corresponding thereto. Then, the key message generator 15, in the same operation as the case of the vendor broadcasting shown in FIG. 13, transmits to the ONU's 20_1 and 20_3 the PLOAM cells 44_32 and 44_33 including the key message 72 including the broadcast cipher key 83 ciphered with the churning key 88 used between the ONU 20_1 and the OLT 10, and the ONU 20_3 and the OLT 10.

Figure 13:
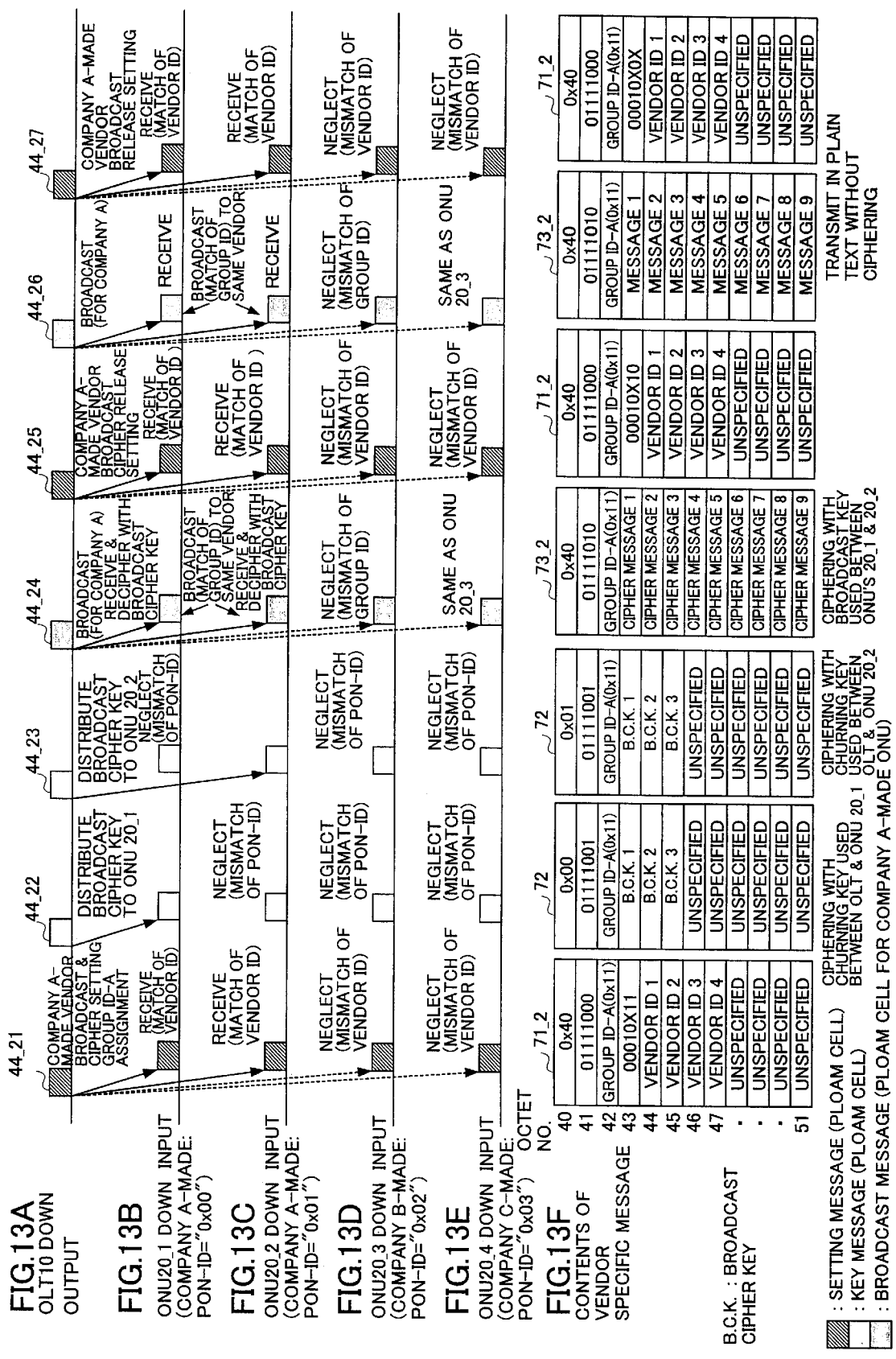
FIGS. 13A–13F are diagrams showing an operation example of vendor broadcasting in an ATM-PON system which is an information transceiver system according to the present invention.

Each of the ONU's 20_1 and 20_3 respectively terminates the key message 72 included in the received PLOAM cells 44_32 and 44_33, deciphers the broadcast cipher key 83 in the same operation as the reception operation of the key message 72 included in the PLOAM cells 44_22 and 44_23 shown in FIG. 13, and stores the group ID 82 and the deciphered broadcast cipher key 83 in the broadcast management table 29.

③ Description of PLOAM Cell 44_34:

After the transmission of the key message 72, the OLT 10 transmits the cipher message 73_2 having the group ID and the message field ciphered with the broadcast cipher key to all of the ONU's 20.

Namely, the generator 16 in the OLT 10 receives from the broadcast manager 13 the broadcast message transmission request signal 77, the group ID 82="0×12", and the setting information corresponding thereto. Then, the OLT 10 transmits the PLOAM cell 44_34 including the cipher message 73_2 of the group ID="0×12" by the same operation as the transmission operation of the cipher message 73_2 included in the PLOAM cell 44_24 shown in FIG. 13.

Each of the ONU's 20_1 and 20_3 receives the PLOAM cell 44_34 in the same operation as the reception operation of the PLOAM cell 44_24 shown in FIG. 13 to decipher the cipher messages 1–9 with the broadcast cipher key 83.

④ Description of PLOAM Cell 44_35:

When releasing the ciphering for the group broadcasting, the OLT 10 transmits the PLOAM cell 44_35 including the setting message 71_3 which is the setting message 71_3 included in the PLOAM cell 44_31 with only the cipher setting C bit of the octet No. "43" differently set to "0: invalid".

Each of the ONU's 20_1 and 20_3 receives the PLOAM cell 44_35, and makes "invalid" the cipher setting corresponding to the group ID="0×12" included in the broadcast management table 29.

It is to be noted that the operation by which each of the ONU's 20_1 and 20_3 determines whether or not the message 71_3 is addressed to its own device is different from that in the vendor broadcasting in FIG. 13. Namely, only when the group ID of the octet No. "42" matches that of the ONU's 20_1 and 20_3 and the bit corresponding to its own device in the group setting field 58 of the octet Nos. "43"–"51" is "1", it is determined that the massage 71_3 is addressed to its own device.

⑤ Description of PLOAM Cell 44_36:

Thereafter, the OLT 10 transmits to all of the ONU's 20 the PLOAM cell 44_36 including the cipher message 73_2 in plain text of the group ID="0×12". Each of the ONU's 20_1 and 20_3 recognizes that the cipher message 73_2 is addressed to its own device based on the group ID="0×12" of the cipher message 73_2, further reads the cipher setting="invalid" referring to the group ID of the broadcast management table 29, and receives the cipher message 73_2 as plain text without being deciphered with the broadcast cipher key 83.

⑥ Description of PLOAM Cell 44_37:

When releasing the group broadcasting, the OLT 10 transmits the PLOAM cell 44_37 including the setting message 71_3 in which only the broadcast setting G bit of the octet No. "43" is changed to "0: invalid (no broadcast setting)" in the setting message 71_3 included in the PLOAM cell 44_35.

Each of the ONU's 20_1 and 20_3 receives the PLOAM cell 44_37, and makes the broadcast setting corresponding to the group ID="0×12" included in the broadcast management table 29 "invalid". As a result, the broadcast setting of the group ID="0×12" is released.

When receiving the cipher message 73_2 (not shown) of the group ID in which the broadcast setting="invalid" is set in the broadcast management table 29, each of the ONU's 20_1 and 20_3 discards the cipher message 73_2.

Figure 15:
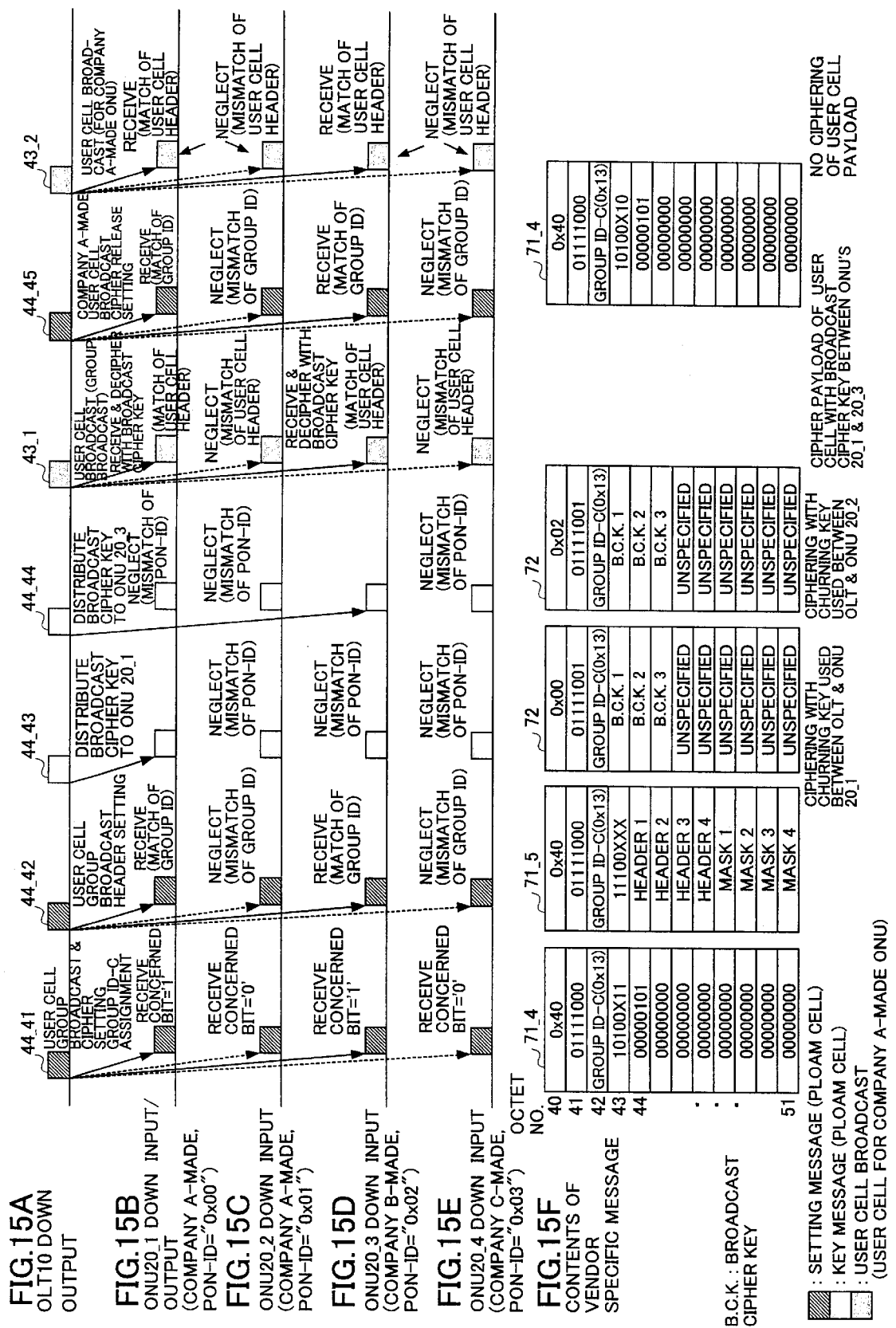
FIGS. 15A–15F are diagrams showing an operation example of user cell group broadcasting in an ATM-PON system which is an information transceiver system according to the present invention.

[4] Description of the operation of the group broadcast by the user cell in FIG. 15.

① Description of PLOAM Cell 44_41:

When the setting request of the user cell group broadcast ciphering of the ONU's 20_1 and 20_3 occurs, the broadcast manager 13 in the OLT 10 writes and saves the setting information in the broadcast management table 19, in the same way as the case where the setting request of the PLOAM cell group broadcast ciphering occurs.

Also, the broadcast manager 13 provides to the generator 14 the setting message transmission request signal 75, the group ID 82, and the setting information corresponding thereto in the same way.

The generator 14 generates the setting message 71_4 (see FIG. 7) in which the PON-ID="0×40" addressed to all of the ONU's, the message ID="0×78" indicating the setting message, and the group ID=e.g. "0×13" are respectively set in the octet Nos. "40"–"42", the broadcast type setting (SSSSS)="10100" indicating the first of the user cell group broadcast setting, the broadcast setting G bit="1: valid", and the cipher setting C bit="1: valid" are set in the octet No. "43", and only the bits g0 and g2 corresponding to the ONU's 20_1 and 20_3 in the group setting field 58 of the octet Nos. "44"–"51" are set to "1".

Namely, since the ONU's 20_1 and 20_3 are designated as a single user cell group, the bits g0 and g2 are set to "1" and the No. for managing this group is the above mentioned group ID="0×13".

The operation in which the message 71_4 is inserted into the PLOAM cell 44_41 to be transmitted to the ONU's 20 is the same as the case of the group broadcast of the PLOAM cell.

Each of the ONU's 20 receives the message 71_4 addressed to all of the ONU's of the PLOAM cell 44_41, and determines whether or not the bit corresponding to its own device within the group setting field 58 of the message 71_4 is set to "1".

Each of the ONU's 20_1 and 20_3 in which the bit corresponding to its own device is set to "1"recognizes that its own device is the object of the user cell group broadcasting to store in the broadcast management table 29 the broadcast type setting="user cell group broadcast" corresponding to the group ID="0×13", the broadcast setting="1", and the cipher setting="1". Each of the ONU's 20_2 and 20_4 in which the bit corresponding to its own device is set to "0" discards the message 71_4.

② Description of PLOAM Cell 44_42:

The OLT 10 generates the setting message 71_5 (see FIG. 8) in which the PON-ID="0×40" addressed to all of the ONU's, the message ID="0×78", the group ID="0×13", and the broadcast type setting (SSSSS)="11100" indicating the second in the user cell group broadcast setting are respectively set in the octet Nos. "40"–"43", the header setting= "headers 1–4" which is header pattern information of the user cell for the object of the user cell group broadcasting is set in the octet Nos. "44"–"47", and the mask setting= "masks 1–4" which is mask information of the header setting is set in the octet Nos. "48"–"51". Then, the OLT 10 transmits the setting message 71_5 included in the PLOAM cell 44_42 to all of the ONU's 20.

Each of the ONU's 20 receives the setting message 71_5 addressed to all of the ONU's, and retrieves whether or not the same group ID as the group ID="0×13" of the message 71_5 is stored in the broadcast management table 29.

Each of the ONU's 20_1 and 20_3 storing the same group ID="0×13" stores in the broadcast management table 29 the header pattern information and the mask information thereof associated with the group ID. Each of the ONU's 20_2 and 20_4 not storing the same group ID discards the setting message 71_5.

③ Description of the PLOAM Cell 44_43:

The OLT 10 firstly generates, in the same way as the case of the PLOAM cell vendor broadcasting and the group broadcasting, the key message 72 in which the PON-ID= "0×00" of the ONU 20_1, the message ID="0×79", the group ID="0×13" are respectively set in the octet Nos. "40"–"42", and 24-bit data "broadcast cipher keys 1–3" in which the broadcast cipher key 83 prepared by the self-running counter or the like is ciphered with the churning key 88 used between its own device and the ONU 20_1 is inserted into the octet Nos. "43"–"45". Then, the OLT 10 transmits the key message 72 included in the PLOAM cell 44_43 to the ONU 20_1.

④ Description of PLOAM Cell 44_44:

Then, the OLT 10 similarly transmits the PLOAM cell 44_44 in which only the octet Nos. "40" and "43"–"45" are different from those in the PLOAM cell 44_43. Namely, the OLT 10 generates the key message 72 in which the PON-ID="0×02" of the ONU 20_3 is set in the octet No. "40", and the broadcast cipher key ciphered with the churning key used between its own device and the ONU 20_3 is set in the octet Nos. "43"–"45". Then, the OLT 10 transmits the key message 72 included in the PLOAM cell 44_44 to the ONU 20_3.

Each of the ONU's 20_1 and 20_3, in the same way as the case of the PLOAM cell vendor broadcasting and the group broadcasting, receives the key message 72 addressed to its own device, deciphers the broadcast cipher key with the churning key used between its own device and the OLT 10, and store the broadcast cipher key associated with the group ID in the broadcast management table 29.

⑤ Description of User Cell 43_1:

The churn processor 11 in the OLT 10 receives from the broadcast manager 13 the broadcast user cell transmission request signal 74, and the setting information corresponding thereto such as the header mask signal 87 including the header setting and the mask setting, and performs the following processing The churn processor 11 determines whether or not the VPI and the VCI patterns of the received user cell 43_1 match the pattern in which the header setting having the broadcast setting of the setting information in the PLOAM cell= "valid" and the mask setting are combined.

For example, when the header 1="0010 1101", the header 2="1001 0000", the header 3="0000 0111", and the header 4="0011 XXXX (X: Don't care)" in the header setting field 59 of the setting message 71_5, and the mask 1="1111 1111", the mask 2="0000 1111", the mask 3="1111 1111", and the mask 4="0000 XXXX" in the mask setting field 60; namely, when the header setting VPI="0010 1101 1001" and VCI="0000 0000 0111 0011", and the mask setting VPI= "1111 1111 0000", VCI="1111 1111 1111 0000", the combination of the VPI=0×2D0–0×2DF and VCI=0×0070–0× 007F forms the user cell of the user cell broadcast.

When the patterns match with each other, the churn processor 11 confirms the broadcast setting and the cipher setting corresponding to the combination. When the broadcast setting="valid" and the cipher setting="valid", the churn processor 11 ciphers the payload field 46 (see FIG. 17) of the user cell 43 with the broadcast cipher key 88 to be provided to the down cell multiplexer 12.

When the broadcast setting="valid" and the cipher setting="invalid", the churn processor 11 transmits the user cell to the down cell multiplexer 12 without ciphering the payload field 46.

When the combination patterns do not match with each other, the churn processor 11 performs a usual churn processing to the user cell 43 to be transmitted.

The down cell multiplexer 12 transmits the user cell 43_1 to all of the ONU's 20.

Each of the ONU's 20 transmits the received user cell 43_1 to the dechurn processors 21. The dechurn processor 21 transmits to the broadcast manager 22 the VPI IVCI signal 89 including the VPI and the VCI of the user cell 43_1.

The broadcast manager 22 masks the VPI and VCI by mask setting, and when the mask setting matches the header setting pattern, the broadcast manager 22 returns to the dechurn processor 21 a match determination signal 90 indicating "match", the broadcast setting corresponding to the header setting and the mask setting, the cipher setting, and the broadcast cipher key 83.

The dechurn processor 21 deciphers the payload field 46 of the user cell 43_1 with the broadcast cipher key 83, when the match determination signal 90="match", the broadcast setting="valid", and the cipher setting="valid". When the match determination signal 90="match", the broadcast setting="valid", and the cipher setting="invalid", the dechurn processor 21 receives the payload field 46 as plain text without being deciphered with the broadcast cipher key 83.

When the match determination signal 90="mismatch", the dechurn processor 21 performs a usual dechurn processing.

⑥ Description of PLOAM Cell 44_45:

When releasing the ciphering for the user cell group broadcasting, the OLT 10 makes the PLOAM cell 44_45 include the message 71_4, which is included in the PLOAM cell 44_41 and in which only the cipher setting C bit in the octet No. "43" is differently set to "0". Then, the OLT 10 transmits the message 71_4.

Each of the ONU's 20_1 and 20_3 whose group ID matches that in the message 71_4 receives the message 71_4 and makes the cipher setting corresponding to the group ID "invalid". Each of the ONU's 20_2 and 20_4 whose group ID do not match that in the message 71_4 discards the message 71_4.

⑦ Description of User Cell 43_2:

Thereafter, each of the ONU's 20_1 and 20_3 receives, in plain text, the payload field 46 of the user cell 43_2 in which the VPI and the VCI of the header field 45 match the pattern by the header setting and the mask setting.

Thus, it becomes possible to transmit/receive the payload field of the user cell less significant in plain text without being ciphered with the broadcast cipher key and to omit the procedure of the ciphering.

Also, in the information transceiver system according to the present invention, the form of transmitting the information can be applied not only to a cell but also to a packet, a frame, or the like.

As described above, an information transceiver system according to the present invention is arranged such that an information transmission device transmits a key message in which a specific information cipher key is ciphered with a usual key used between its own device and a destination information reception device, and transmits to the destination information reception device a cipher message in which specific information is ciphered with the specific information cipher key.

Then, the information reception device deciphers a specific information cipher key included in a key message addressed to its own device with a usual key used between its own device and a source information transmission device and deciphers with the specific information cipher key the cipher message following the key message.

Thus, it becomes possible to perform ciphering and deciphering in unicasting or broadcasting between the information transmission device and the information reception device having a common specific information cipher key.

Also, the information transceiver system according to the present invention is arranged such that in the presence of a plurality of destination information reception devices, the information transmission device provides to the information reception devices setting information of broadcast setting information of a unicast, a broadcast, or the like, cipher setting information, vendor setting information, a group setting information, or the like. Therefore, unicasting, broadcasting, vendor broadcasting, and group broadcasting can be performed, the ciphering and deciphering thereof become easy, and the efficiency can be improved.

Also, by applying an OLT device and an ONU device of a PON-ATM prescribed in ITU-T G.983 to the information transceiver system of the present invention, and by transmitting the specific information and the setting information by a vendor specific message of a PLOAM cell, or by transmitting the specific information by a payload field of a user cell, unicasting, broadcasting, vendor broadcasting, and group broadcasting can be performed, the ciphering and deciphering thereof become easy, and the efficiency can be improved.

What we claim is:

1. An information transmission device in an information transceiver system for transmitting specific information comprising:
   a cipher message generator for generating a cipher message in which the specific information is ciphered with a specific information cipher key;
   a key message generator for generating a key message in which the specific information cipher key is ciphered with a usual key used between its own device and a destination information reception device; and
   a message transmitter for transmitting the key message and the following cipher message to the destination information reception device corresponding thereto,
   wherein in presence of a plurality of destination information reception devices, the key message generator generates key messages in which the specific information cipher key is ciphered with mutually independent usual keys used between its own device and the destination information reception devices, and the cipher message generator generates the cipher message for the information reception devices.

2. The information transmission device as claimed in claim 1, further comprising a setting message generator for generating a setting message including broadcast setting information indicating whether or not the cipher message should be transmitted by broadcasting, the message transmitter transmitting the setting message and then transmitting the cipher message by broadcasting when broadcasting is set, while otherwise transmitting the cipher message addressed to the information reception devices by unicasting.

3. The information transmission device as claimed in claim 2 wherein the setting message further includes vendor setting information for designating that the broadcasting is performed only to information reception devices made by a same vendor, and the message transmitter, after transmitting the setting message, transmits the cipher message by vendor broadcasting when a vendor and broadcasting are set.

4. The information transmission device as claimed in claim 2 wherein the setting message further includes group setting information for designating that the broadcasting is performed only to information reception devices in a specific group, and the message transmitter, after transmitting the setting message, transmits the cipher message by group broadcasting when a group and broadcasting are set.

5. The information transmission device as claimed in claim 1 further comprising a setting message generator for generating a setting message including cipher setting information indicating whether or not the specific information is set to be ciphered with the specific information cipher key, the message transmitter transmitting the setting message and then transmitting the cipher message ciphered with the specific information cipher key when the specific information is set to be ciphered, while otherwise transmitting a not-ciphered cipher message.

6. The information transmission device as claimed in claim 1 wherein the device comprises an OLT device prescribed by ITU-T G.983.

7. The information transmission device as claimed in claim 6 wherein the key message generator inserts the specific information cipher key into a vendor specific message of a PLOAM cell, and ciphers the specific information cipher key with the usual key to generate the key message.

8. The information transmission device as claimed in claim 7 wherein the usual key comprises a churning key.

9. The information transmission device as claimed in claim 6 wherein the cipher message generator inserts the specific information into a message field of a PLOAM cell, and generates the cipher message ciphered with the specific information cipher key.

10. The information transmission device as claimed in claim 6 wherein the setting message generator generates at least any one of cipher setting information, broadcast setting information, header setting information, and group setting information in a message field of a PLOAM cell.

11. An information transmission device in an information transceiver system for transmitting specific information comprising:

a cipher message generator for generating a cipher message in which the specific information is ciphered with a specific information cipher key;

a key message generator for generating a key message in which the specific information cipher key is ciphered with a usual key used between its own device and a destination information reception device;

a message transmitter for transmitting the key message and the following cipher message to the destination information reception device corresponding thereto; and a setting message generator for generating a setting message including cipher setting information indicating whether or not the specific information is set to be ciphered with the specific information cipher key, the message transmitter transmitting the setting message and then transmitting the cipher message ciphered with the specific information cipher key when the specific information is set to be ciphered, while otherwise transmitting a not-ciphered cipher message.

12. The information transmission device as claimed in claim 11 wherein when the specific information is not set to be ciphered with the specific information cipher key, the message transmitter transmits a message in which the specific information is ciphered with the usual key.

13. The information transmission device as claimed in claim 11 wherein the device comprises an OLT device prescribed by ITU-T G.983.

14. The information transmission device as claimed in claim 13 wherein the key message generator inserts the specific information cipher key into a vendor specific message of a PLOAM cell, and ciphers the specific information cipher key with the usual key to generate the key message.

15. The information transmission device as claimed in claim 14 wherein the usual key comprises a churning key.

16. The information transmission device as claimed in claim 13 wherein the cipher message generator inserts the specific information into a message field of a PLOAM cell, and generates the cipher message ciphered with the specific information cipher key.

17. The information transmission device as claimed in claim 13 wherein the setting message generator generates at least any one of cipher setting information, broadcast setting information, header setting information, and group setting information in a message field of a PLOAM cell.

18. An information reception device for transmitting specific information comprising:

a key message processor for deciphering a specific information cipher key included in a received key message addressed to its own device with a usual key used between its own device and a source information transmission device;

a cipher message processor for deciphering with the specific information cipher key a cipher message following the key message and ciphered with the specific information cipher key from the source information transmission device; and a setting message processor for receiving a setting message from the source information transmission device, the setting message processor storing cipher setting information included in the setting message and indicating whether or not the specific information is set to be ciphered with the specific information cipher key, and the cipher message processor, based on the cipher setting information, receiving the cipher message after being deciphered with the specific information cipher key or without being deciphered.

19. The information reception device as claimed in claim 18 wherein the device comprises an ONU device prescribed by ITU-T G.983.

20. The information reception device as claimed in claim 19 wherein the key message processor receives the key message as a vendor specific message of a PLOAM cell, and deciphers a message field thereof with the usual key.

21. The information reception device as claimed in claim 20 wherein the usual key comprises a churning key.

22. The information reception device as claimed in claim 19 wherein the cipher message processor deciphers a message field of a PLOAM cell received as the cipher message with the specific information cipher key.

23. The information reception device as claimed in claim 19 wherein the setting message processor receives at least any one of cipher setting information, broadcast setting information, header setting information, and group setting information included in a message field of a PLOAM cell.

24. An information reception device for transmitting specific information comprising:

a key message processor for deciphering a specific information cipher key included in a received key message addressed to its own device with a usual key used between its own device and a source information transmission device;

a cipher message processor for deciphering with the specific information cipher key a cipher message following the key message and ciphered with the specific information cipher key from the source information transmission device; and a setting message processor for receiving a setting message from the source information transmission device, the setting message processor storing broadcast setting information included in the setting message and indicating whether or not the cipher message is transmitted by broadcasting, and the cipher message processor, based on the broadcast setting information, receiving a cipher message for unicasting or broadcasting.

25. The information reception device as claimed in claim 24 wherein when a vendor designated by vendor setting information included in the setting message is a vendor of its own device, the setting message processor stores that the vendor of its own device is designated, and when a vendor and broadcasting are designated, the cipher message processor receives a cipher message for vendor broadcasting addressed to its own vendor.

26. The information reception device as claimed in claim 24 wherein when its own device belongs to a group designated by group setting information included in the setting message, the setting message processor stores a group ID thereof, and when a group ID and broadcasting are designated, the cipher message processor receives a cipher message of group broadcasting of the group to which its own device belongs.

27. The information reception device as claimed in claim 24 wherein the device comprises an ONU device prescribed by ITU-T G.983.

28. The information reception device as claimed in claim 27 wherein the key message processor receives the key message as a vendor specific message of a PLOAM cell, and deciphers a message field thereof with the usual key.

29. The information reception device as claimed in claim 28 wherein the usual key comprises a churning key.

30. The information reception device as claimed in claim 27 wherein the cipher message processor deciphers a message field of a PLOAM cell received as the cipher message with the specific information cipher key.

31. The information reception device as claimed in claim 27 wherein the setting message processor receives at least any one of cipher setting information, broadcast setting information, header setting information, and group setting information included in a message field of a PLOAM cell.

32. An information transmission device in an information transceiver system for transmitting specific information comprising:
 a cipher message generator for generating a cipher message in which the specific information is ciphered with a specific information cipher key;
 a key message generator for generating a key message in which the specific information cipher key is ciphered with a usual key used between its own device and a destination information reception device;
 a message transmitter for transmitting the key message and the following cipher message to the destination information reception device corresponding thereto;
 a setting message generator for generating a setting message including at least any one of cipher setting information indicating whether or not the specific information is set to be ciphered with the specific information cipher key, broadcast setting information indicating whether or not the cipher message should be transmitted by broadcasting, and header mask setting information for designating a specific user cell; and
 a churn processor for transmitting the specific information inserted into a payload field of a user cell designated by the header mask setting information in forms indicated by the cipher setting information and the broadcast setting information
 wherein the device comprises an OLT device prescribed by ITU-T G.983, and the key message generator inserts the specific information cipher key into a vendor specific message of a PLOAM cell, and ciphers the specific information cipher key with the usual key to generate the key message.

33. An information reception device for transmitting specific information comprising:
 a key message processor for deciphering a specific information cipher key included in a received key message addressed to its own device with a usual key used between its own device and a source information transmission device;
 a cipher message processor for deciphering with the specific information cipher key a cipher message following the key message and ciphered with the specific information cipher key from the source information transmission device;
 a setting message processor for storing at least any one of cipher setting information included in a setting message received from the source information transmission device and indicating whether or not the specific information is set to be ciphered with the specific information cipher key, broadcast setting information indicating whether or not the cipher message should be transmitted by broadcasting, and header mask setting information for designating a specific user cell; and
 a dechurn processor for receiving the specific information inserted into a payload field of a user cell designated by the header mask setting information in forms indicated by the cipher setting information and the broadcast setting information,
 wherein the device comprises an ONU device prescribed by ITU-T G.983, and the key message processor receives the key message as a vendor specific message of a PLOAM cell, and deciphers a message field thereof with the usual key.

* * * * *